United States Patent
Shin

(10) Patent No.: US 9,998,875 B2
(45) Date of Patent: Jun. 12, 2018

(54) METHOD FOR MANAGING BEACON, TERMINAL DEVICE, SERVER AND STORAGE MEDIUM

(71) Applicant: Samsung Electronics Co., Ltd., Gyeonggi-do (KR)

(72) Inventor: Sung-Jae Shin, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 55 days.

(21) Appl. No.: 14/815,069

(22) Filed: Jul. 31, 2015

(65) Prior Publication Data

US 2016/0066154 A1 Mar. 3, 2016

(30) Foreign Application Priority Data

Aug. 29, 2014 (KR) .................. 10-2014-0114503

(51) Int. Cl.
*H04W 4/02* (2018.01)
*G01C 21/20* (2006.01)
(Continued)

(52) U.S. Cl.
CPC .......... *H04W 4/027* (2013.01); *G01C 21/206* (2013.01); *G01S 5/0018* (2013.01); *G01S 5/0226* (2013.01); *G06Q 30/0267* (2013.01); *H04W 4/008* (2013.01); *H04W 4/021* (2013.01); *H04W 64/006* (2013.01)

(58) Field of Classification Search
CPC ... H04W 4/027; H04W 4/021; H04W 64/006; H04W 4/008; H04W 4/02; H04W 64/00; H04W 48/04; H04W 84/18; G01S 5/0018; G01S 5/0226; G01S 5/02; G01S 5/0252; G01S 5/14; G01S 19/14; G06Q 30/0267; G01C 21/206; H04L 29/08657; H04L 29/08108; H04L 29/08936;
(Continued)

(56) References Cited

U.S. PATENT DOCUMENTS 5,387,916 A * 2/1995 Cohn .................... G01S 13/751
342/44
2008/0077326 A1 * 3/2008 Funk .................... G01C 21/165
701/500

(Continued)

FOREIGN PATENT DOCUMENTS

| CN | 103687079 | 3/2014 |
|---|---|---|
| KR | 10-2014-0070220 | 6/2014 |
| WO | WO 2014/069737 | 5/2014 |

OTHER PUBLICATIONS

Ericsson, "Inclusion of Definition of WLAN Beacon RSSI in UMTS Specifications", R1-143293, 3GPP TSG-RAN1 Meeting #78, Aug. 18-22, 2014, 10 pages.

(Continued)

*Primary Examiner* — Sharad Rampuria
(74) *Attorney, Agent, or Firm* — The Farrell Law Firm, P.C.

(57) ABSTRACT

A beacon managing method is provided. The method includes receiving a first beacon signal from a first beacon at a first time; receiving a second beacon signal from a second beacon at a second time; and identifying a location error of at least one of the first beacon and the second beacon, based on first movement information of a terminal between the first time and the second time.

30 Claims, 24 Drawing Sheets

(51) Int. Cl.
*G06Q 30/02* (2012.01)
*H04W 4/00* (2018.01)
*H04W 64/00* (2009.01)
*G01S 5/00* (2006.01)
*G01S 5/02* (2010.01)

(58) Field of Classification Search
CPC ......... H04M 1/72572; H04M 1/72577; H04M 1/7253; H04M 2250/02
USPC .............................................. 455/41.2, 456.1
See application file for complete search history.

(56) References Cited

U.S. PATENT DOCUMENTS

| | | | |
|---|---|---|---|
| 2010/0246405 A1* | 9/2010 | Potkonjak | G01S 5/0226 370/241 |
| 2011/0306357 A1* | 12/2011 | Alizadeh-Shabdiz | G01S 5/0278 455/456.1 |
| 2012/0182933 A1* | 7/2012 | Bandhakavi | G01S 5/0242 370/328 |
| 2013/0035110 A1* | 2/2013 | Sridhara | H04W 4/021 455/456.1 |
| 2013/0137457 A1 | 5/2013 | Potkonjak | |
| 2013/0261964 A1 | 10/2013 | Goldman et al. | |
| 2013/0281084 A1* | 10/2013 | Batada | H04W 4/008 455/426.1 |
| 2014/0118113 A1 | 5/2014 | Kaushlk et al. | |
| 2016/0007309 A1 | 1/2016 | Lee et al. | |

OTHER PUBLICATIONS

Anonymous: "Dead reckoning—Wikipedia, the free encyclopedia", Aug. 23, 2014, 7 pages.
International Search Report dated Dec. 1, 2015 issued in counterpart application No. PCT/KR2015/008934, 8 pages.
European Search Report dated Jan. 19, 2016 issued in counterpart application No. 15182888.6-1870, 7 pages.
European Search Report dated Dec. 21, 2016 issued in counterpart application No. 15182888.6-1870, 6 pages.

* cited by examiner

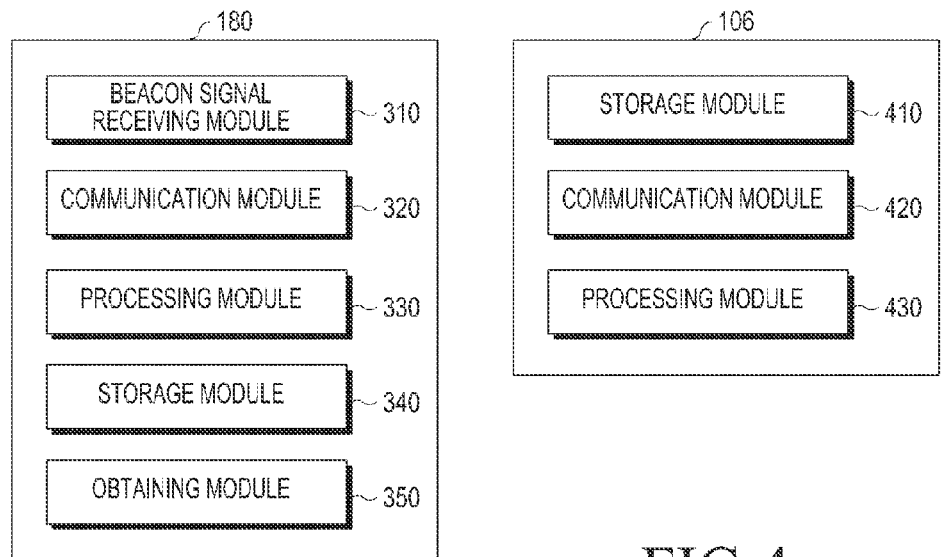
FIG.3
FIG.4
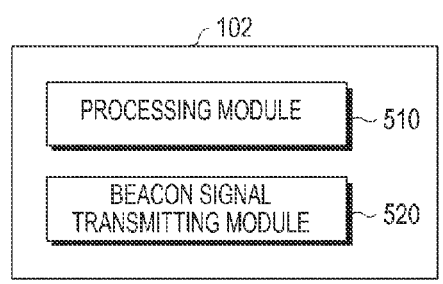
FIG.5

| BID | Name | Type | LAT | LNG | LEV | Venue | Partner | ServiceYN | Tag |
|---|---|---|---|---|---|---|---|---|---|
| 1 | BID1 | Beacon | 36.222 | 126.232 | 1 | Costco_LA1 | Costco | Y | Store |
| 2 | BID2 | Beacon | 36.222 | 126.232 | 1 | Costco_LA1 | Costco | Y | Toilet |
| 3 | BID3 | Wifi | 36.222 | 126.232 | 1 | Costco_LA1 | Costco | Y | Store |
| 4 | BID4 | Ant | 36.222 | 126.232 | 1 | Costco_LA1 | Costco | Y | Store |

METHOD FOR MANAGING BEACON, TERMINAL DEVICE, SERVER AND STORAGE MEDIUM

PRIORITY

This application claims priority under 35 U.S.C. § 119(a) to Korean Patent Application Serial No. 10-2014-0114503, which was filed in the Korean Intellectual Property Office on Aug. 29, 2014, the entire disclosure of which is incorporated herein by reference.

BACKGROUND

1. Field of the Invention

The present invention relates generally to beacon managing methods, and more specifically, to beacon managing methods for processing beacon signals.

2. Description of the Related Art

A beacon is a device that transmits beacon signals at predetermined time intervals based on various communication schemes (e.g., Bluetooth®, Wi-Fi®, ANT®, etc.). A terminal receives a beacon signal from the beacon, often to display information related to a region in which the beacon is located, e.g., to provide an advertisement service. Accordingly, beacon-related technologies are gaining popularity.

Further, beacons reduce infrastructure costs and provide a wide effective distance, as compared with Near Field Communication (NFC)®, and present more applicability.

Generally, a signal transmitted from a beacon has an effective range of 5 cm to 50 m, and a terminal may receive data when passing near the beacon. Accordingly, beacons, by such nature, have various applications, such as for providing advertisements in department stores, showcases in exhibition halls, or seat guidance/advertisement in stadiums.

Topographical information on an area in which a beacon has been installed may be managed by a server. A beacon is often manufactured in a small size, and thus, may be freely moved. However, because a beacon may be easily moved, beacons are often moved without updating the topographical information. Consequently, a beacon may provide information that is not relevant to its actual position.

Similar problems can occur even when a beacon is not moved, but a topology change occurs, like when departments in a department store are rearranged, without properly updating the topographical information.

SUMMARY

Accordingly, the present invention is designed to address at least the problems and/or disadvantages described above and to provide at least the advantages described below.

An aspect of the present invention to provide a beacon managing method and apparatus for addressing the foregoing or other issues.

In accordance with an aspect of the present invention, a beacon managing method is provided, which includes receiving a first beacon signal from a first beacon at a first time; receiving a second beacon signal from a second beacon at a second time; and identifying a location error of at least one of the first beacon and the second beacon, based on first movement information of a terminal between the first time and the second time.

In accordance with another aspect of the present invention, a beacon managing method is provided, which includes receiving a first beacon signal from a first beacon at a first time; receiving a second beacon signal from a second beacon at a second time; obtaining a first distance between the first beacon and the second beacon; and identifying a location error of at least one of the first beacon and the second beacon, based on a result of a comparison between a time difference between the first time and the second time and a threshold set according to the first distance.

In accordance with another aspect of the present invention, a beacon managing method is provided, which includes receiving a first beacon signal from a first beacon at a first time; receiving a second beacon signal from a second beacon at a second time; and identifying a location error of at least one of the first beacon and the second beacon, based on whether there is an inter-floor difference between the first beacon and the second beacon and whether the first beacon and the second beacon is movable between floors.

In accordance with another aspect of the present invention, a beacon managing method by a beacon managing server is provided, which includes receiving, from a terminal, a request for a distance between a first beacon and a second beacon; transmitting, to the terminal, the distance between the first beacon and the second beacon; receiving error, information of the first beacon from the terminal; and updating beacon information on the first beacon based on the received error information.

In accordance with another aspect of the present invention, a beacon managing method by a beacon managing server is provided, which includes receiving, from each of a plurality of terminals, a beacon recognition log including terminal information; updating beacon information based on the received beacon recognition log; and transmitting at least one of the updated beacon information and an indication that a beacon has been updated.

In accordance with another aspect of the present invention, a terminal is provided, which includes a beacon signal receiving module configured to receive a first beacon signal from a first beacon at a first time and to receive a second beacon signal from a second beacon at a second time; and a processor configured to identify a location error of at least one of the first beacon and the second beacon, based on first movement information of the terminal between the first time and the second time.

In accordance with another aspect of the present invention, a server is provided, which includes a communication module configured to receive, from a terminal, a request for a distance between a first beacon and a second beacon, to transmit, to the terminal, the distance between the first beacon and the second beacon, and to receive, from the terminal, error information of the first beacon; and a processor configured to update beacon information on the first beacon, based on the error information.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 3 illustrates a beacon managing module of an electronic device according to an embodiment of the present invention;

FIG. 4 illustrates a server according to an embodiment of the present invention;

FIG. 5 illustrates a beacon according to an embodiment of the present invention;

DETAILED DESCRIPTION OF EMBODIMENTS OF THE INVENTION

Figure 1:
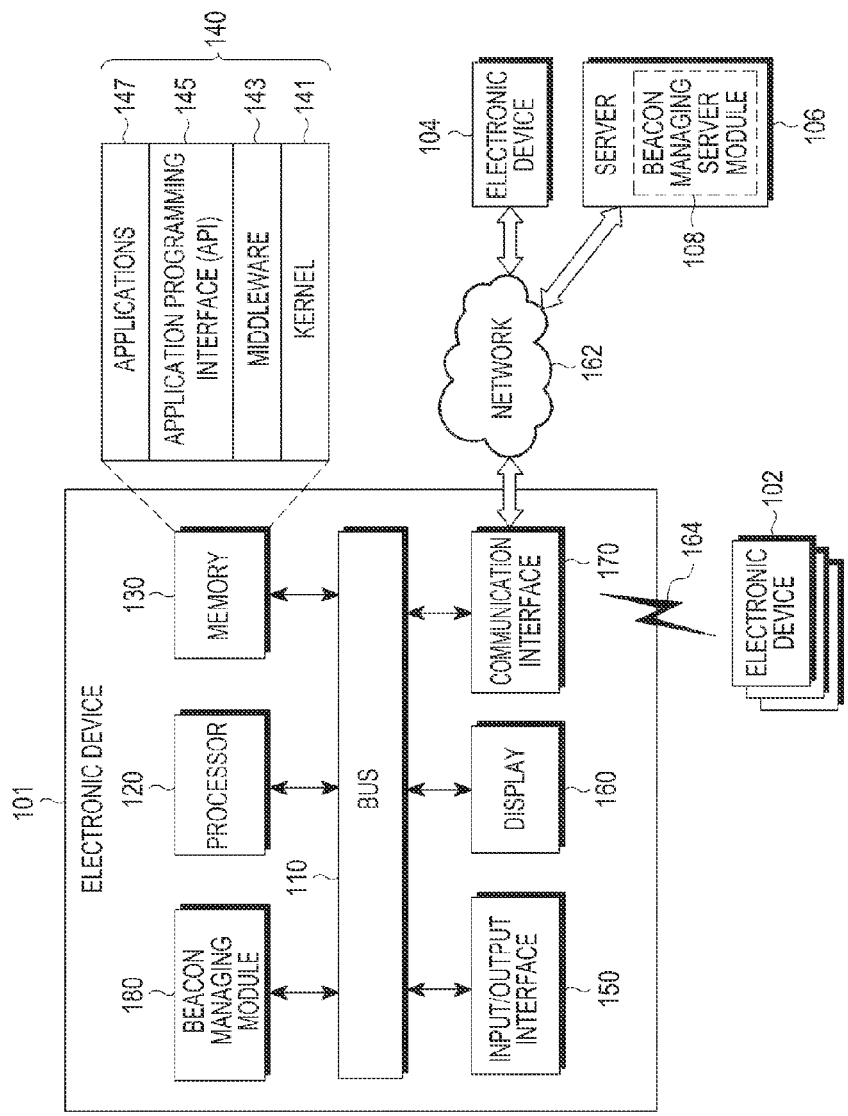
FIG. 1 illustrates a network environment including an electronic device according to an embodiment of the present invention.

Hereinafter, various embodiments of the present invention are described with reference to the accompanying drawings. However, it should be appreciated that the present invention is not limited to the described embodiments, and all changes and/or equivalents or replacements thereto also belong to the scope of the present invention.

The same or similar reference numerals may be used to refer to the same or similar elements throughout the specification and the drawings.

Herein, the terms "have," "may have," "include," or "may include" (e.g., a number, function, operation, or a component such as a part) indicate the existence of the feature, and do not exclude the existence of other features.

Herein, the terms "A or B," "at least one of A and/or B," or "one or more of A and/or B" may include all possible combinations of A and B, e.g., (1) including at least one A, (2) including at least one B, or (3) including at least one A and at least one B.

Herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be referred to as a second component, and vice versa, without departing from the scope of the present invention.

It will be understood that when an element (e.g., a first element) is referred to as being (operatively or communicatively) "coupled with/to," or "connected with/to" another element (e.g., a second element), the element can be directly coupled or connected with/to the other element or via a third element. However, when an element is referred to as being "directly coupled with/to" or "directly connected with/to" another element, no other element (e.g., a third element) intervenes between the element and the another element.

Herein, the terms "configured (or set) to" may be interchangeably used with terms "suitable for," "having the capacity to," "designed to," "adapted to," "made to," or "capable of" depending on circumstances. The term "configured (or set) to" may mean "specifically designed in hardware to." and may also mean that a device can perform an operation together with another device or parts. For example, the term "a processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

Herein, the term "module" may refer to a unit including one of hardware, software, and firmware, or a combination thereof. The term "module" may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs)

that perform some operations, which have already been known or will be developed in the future.

The terminology as used herein is provided merely to describe some embodiments thereof, but not to limit the scope of other embodiments of the present invention.

The singular forms "a," "an," and "the" include plural references unless the context clearly dictates otherwise.

All terms, including technical and scientific terms, as used herein have the same meanings as commonly understood by one of ordinary skill in the art to which the embodiments of the present invention belong. Further, terms, such as those defined in commonly used dictionaries, should be interpreted as having meanings that are consistent with their recognized meanings in the context of the relevant art and should not be interpreted in an idealized or overly formal sense unless expressly so defined herein. In some cases, the terms defined herein may be interpreted to exclude embodiments of the present disclosure.

Herein, the term "user" may denote a human or another device (e.g., an artificial intelligent electronic device) that uses an electronic device.

Examples of an electronic device according to an embodiment of the present invention include a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, a wearable device (e.g., smart glasses, a head-mounted device (HMD), electronic clothes, an electronic bracelet, an electronic necklace, an electronic appcessory, an electronic tattoo, a smart mirror, or a smart watch), etc.

Further, an electronic device according to an embodiment of the present invention may be a smart home appliance. Examples of the smart home appliance include a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync®, Apple TV®, or Google TV®), a gaming console (e.g., Xbox® or PlayStation®), an electronic dictionary, an electronic key, a camcorder, or an electronic picture frame.

Additionally, an electronic device according to an embodiment of the present invention may include various medical devices (e.g., diverse portable medical measuring devices such as a blood sugar measuring device, a heartbeat measuring device, or a body temperature measuring device, a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a sailing navigation device or a gyro compass), avionics devices, security devices, vehicular head units, industrial or home robots, automatic teller machines (ATMs), point of sales (POS) devices, or Internet of Things (IoT) devices (e.g., a bulb, various sensors, an electric or gas meter, a sprinkler, a fire alarm, a thermostat, a street light, a toaster, fitness equipment, a hot water tank, a heater, or a boiler).

An electronic device according to an embodiment of the present invention may also be furniture, part of a building/structure, an electronic board, an electronic signature receiving device, a projector, or various measurement devices (e.g., devices for measuring water, electricity, gas, or electromagnetic waves).

Further, an electronic device according to an embodiment of the present invention may be a combination of the above-listed devices.

An electronic device according to an embodiment of the present invention may also be a flexible electronic device.

However, an electronic device herein is not limited to the above-listed devices, and may include new and other electronic devices depending on the development of technology.

FIG. 1 illustrates a network environment including an electronic device according to an embodiment of the present invention.

Referring to FIG. 1, the network environment includes an electronic device 101, which includes a bus 110, a processor 120, a memory 130, an input/output interface 150, a display 160, a communication interface 170, and a beacon managing module 180. In some embodiments, the electronic device 101 may exclude at least one of the components or may add another component.

The bus 110 includes a circuit for connecting the components 120 to 180 and transferring communications (e.g., control messages and/or data) between the components 120 to 180.

The processing module 120 may include one or more of CPUs, an application processor (AP), or a communication processor (CP). The processor 120 may perform control on at least one of the other components of the electronic device 101, and/or perform an operation or data processing relating to communication. The processor 120 may also be referred to as a controller, or the processor 120 may include a controller as a part thereof.

The memory 130, which may include a volatile and/or non-volatile memory, may store commands or data related to at least one other component of the electronic device 101. Further, the memory 130 stores software and/or a program 140.

The program 140 includes a kernel 141, middleware 143, an application programming interface (API) 145, and/or application programs (or applications) 147. At least a portion of the kernel 141, middleware 143, or API 145 may be referred to as an operating system (OS).

The kernel 141 may control or manage system resources (e.g., the bus 110, processor 120, or a memory 130) used to perform operations or functions implemented in other programs (e.g., the middleware 143, API 145, or application programs 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. The middleware 143 may control work requests received from the applications 147, e.g., by allocation the priority of using the system resources of the electronic device 101 to at least one of the plurality of applications 134.

The API 145 is an interface allowing the applications 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, a microelectromechanical systems (MEMS) display, or an electronic paper display. The display 160 may display various content (e.g., text, images, videos, icons, or symbols) to the user. The display 160 may also include a touchscreen and may receive, e.g., a touch, gesture, proximity or hovering input using an electronic pen or a body part of the user.

The power manager module 170 may manage power of the electronic device 101, for example. For example, the communication interface 170 may be connected with a network 162 through wireless or wired communication in order to communicate with an external electronic device (e.g., a second external electronic device 104 or a server 106).

In FIG. 1, a first external electronic device 102 may be a beacon, which communicates beacon signals at predetermined time intervals. For example, the first external electronic device 102 may communicate the beacon signals based on various communication protocols, such as Bluetooth®, Wi-Fi®, or ANT®.

The wireless communication may also use at least one of, e.g., Long Term Evolution (LTE)®, LTE-Advanced (LTE-A)®, code division multiple access (CDMA)®, wideband CDMA (WCDMA)®, universal mobile telecommunications system (UMTS)®, wireless broadband (WiBro)®, LiFi®, or global system for mobile communications (GSM)®, as a cellular communication protocol. The wired connection may include at least one of universal serial bus (USB), high definition multimedia interface (HDMI), recommended standard 232 (RS-232), or plain old telephone service (POTS). The network 162 may include at least one of a telecommunication network, e.g., a computer network (e.g., a local area network (LAN) or wide area network (WAN)), Internet, or a telephone network.

The first and second external electronic devices 102 and 104 each may be a device of the same or a different type from the electronic device 101.

The server 106 may include a group of one or more servers. All or some of the operations executed on the electronic device 101 may be executed on another or multiple other electronic devices (e.g., the electronic devices 102 and 104 or server 106). Further, when the electronic device 101 should perform some function or service automatically or at a request, the electronic device 101, instead of executing the function or service on its own or additionally, may request another device 102, 104, or 106 to perform at least some functions associated therewith. The other electronic device 102, 104, or 106) may execute the requested functions or additional functions and transfer a result of the execution to the electronic device 101. The electronic device 101 may provide a requested function or service by processing the received result as it is or additionally. For example, a cloud computing, distributed computing, or client-server computing technique may be used.

The beacon managing module 180 may support to drive the electronic device 101 by performing at least one operation implemented on the electronic device 101. For example, the server 106 includes a beacon managing server module 108 that may support the beacon managing module 180 implemented in the electronic device 101. The beacon managing server module 108 may include at least one element of the beacon managing module 180 in order to perform at least one operation normally performed by the beacon managing module 180.

The beacon managing module 180 may process at least part of information obtained from other elements (e.g., at least one of the processor 120, the memory 130, the input/output interface 150, or the communication interface 170) and may use the same in various manners. For example, the beacon managing module 180 may control at least some functions of the electronic device 101 using the processor 120 or independently from the processor 120, such that the electronic device 101 may interwork with another electronic device (e.g., the electronic device 102 or 104 or the server 106).

The beacon managing module 180 may be integrated with the processor 120 or the communication interface 170.

At least one configuration of the beacon managing module 180 may be included in the server 106 (e.g., the beacon managing server module 108) and may be supported for at least one operation implemented on the beacon managing module 180 from the server 106.

Figure 2:
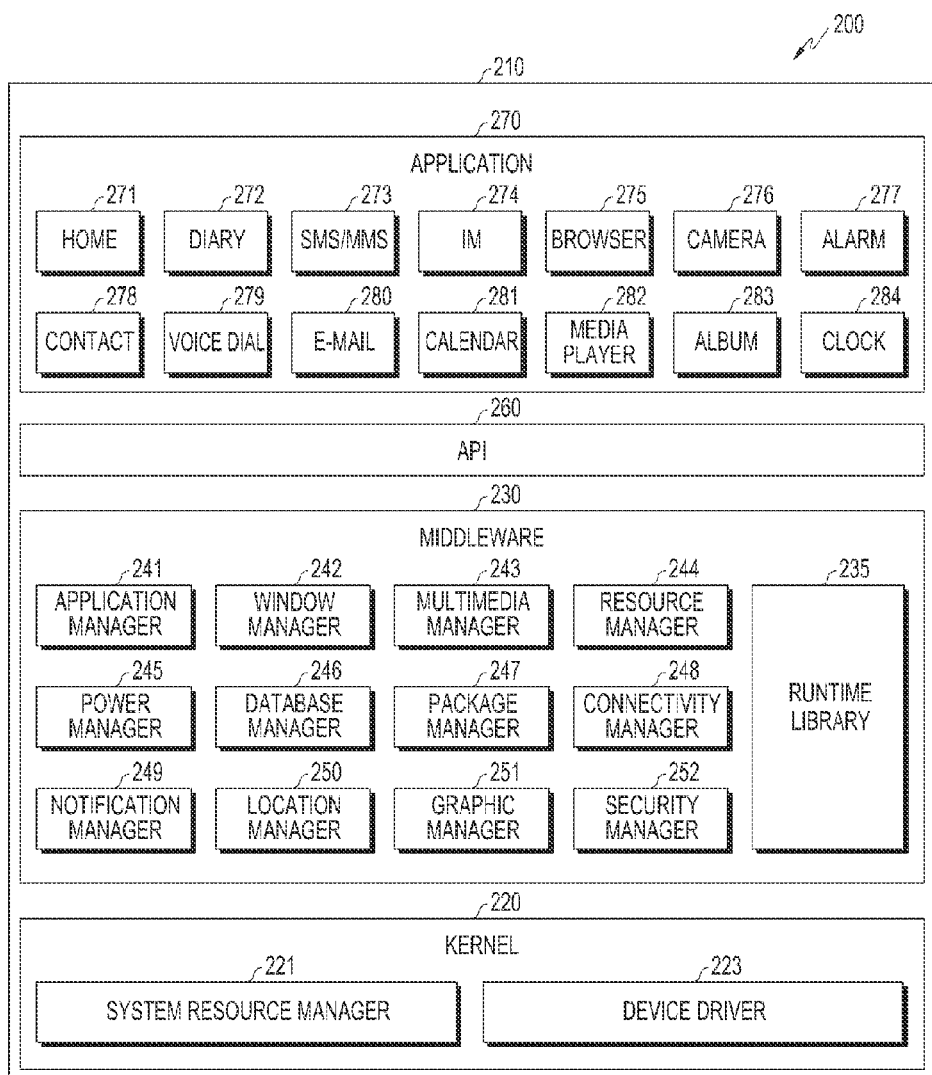
FIG. 2 illustrates a program module according to an embodiment of the present invention.

FIG. 2 illustrates a program module according to an embodiment of the present invention. For example, the program module 210 in FIG. 2 can be used as the program 140 in a network environment as illustrated in FIG. 1.

Referring to FIG. 2, the program module 210 may include an OS controlling resources related to the electronic device and/or various applications driven on the OS. For example, the OS includes Android®, iOS®, Windows®, Symbian®, Tizen®, or Bada®.

The program 210 includes a kernel 220, middleware 230, an API 260, and applications 270. At least a part of the program module 210 may be preloaded on the electronic device or may be downloaded from a server.

The kernel 220 includes a system resource manager 221 and a device driver 223. The system resource manager 221 may perform control, allocation, or recovery of system resources. The system resource manager 221 may also include a process managing unit, a memory managing unit, or a file system managing unit. The device driver 223 may include a display driver, a camera driver, a Bluetooth driver, a shared memory driver, a USB driver, a keypad driver, a Wi-Fi driver, an audio driver, an inter-process communication (IPC) driver, etc. In other embodiments, the kernel 220 may include a system resource manager 221 or a device driver 223.

The middleware 230 may provide various functions to the application 270 through the API 260 in order for the application 270 to efficiently use limited system resources in the electronic device or provide functions jointly required by applications 270. The middleware 230 includes a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, and a security manager 252. In other embodiments, some libraries and managers may be removed and/or other libraries and managers may be added.

For example, when the electronic device has a telephony capability, the middleware 230 may further include a telephony manager for managing voice call or video call functions of the electronic device.

The middleware 230 may also include a middleware module forming a combination of various functions of the above-described components.

The middleware 230 may also provide a specified module per type of the operating system in order to provide a differentiated function.

The runtime library 235 may include a library module used by a compiler to add a new function through a programming language, e.g., while the application 270 is being executed. The runtime library 235 may perform input/output management, memory management, operation on arithmetic functions, etc.

The application manager 241 may manage the life cycle of at least one of the applications 270.

The window manager 242 may manage graphic user interface (GUI) resources used on the screen.

The multimedia manager 243 may manage formats for playing various media files and use a codec appropriate for a format to perform encoding or decoding on media files.

The resource manager 244 may manage resources, such as a source code of at least one of the applications 270, memory, or storage space.

The power manager 245 may operate together with a basic input/output system (BIOS) to manage battery or power and provide power information for operating the electronic device.

The database manager 246 may generate, search, or vary a database to be used in at least one of the applications 270.

The package manager 247 may manage installation or update of an application that is distributed in the form of a package file.

The connectivity manager 248 may manage wireless connectivity, e.g., Wi-Fi or Bluetooth.

The notification manager 249 may display or notify an event, such as an incoming message, an appointment, or a proximity notification, of the user without interfering with the user.

The location manager 250 may manage location information on the electronic device.

The graphic manager 251 may manage graphic effects to be offered to the user and their related user interface.

The security manager 252 may provide various security functions for system security or user authentication.

The API 260 may be a set of API programming functions and may have different configurations depending on the type of OS. For example, when using Android® or iOS®, one API set may be provided per platform, and when using Tizen®, two or more API sets may be offered per platform.

The applications 270 may include one or more applications that provide functions. The applications 270 include a home 271, a dialer 272, a short message service (SMS)/multimedia messaging service (MMS) 273, an instant message (IM) service 274, a browser 275, a camera 276, an alarm 277, a contact list 278, a voice dialer 279, an email service 280, a calendar 281, a media player 282, a photo album 283, and a clock 284. The applications 270 also include other applications, such as a health-care service (e.g., measuring the degree of workout or blood sugar) or environmental information provider (e.g., provision of air pressure, moisture, or temperature information).

The applications 270 may also include an application for information exchange between the electronic device and an external electronic device (hereinafter, "an information exchanging application"). Examples of the information exchange application include, but are not limited to, a notification relay application for transferring specific information to the external electronic device or a device management application for managing the external electronic device.

For example, the notification relay application may include a function for relaying notification information generated from other applications of the electronic device (e.g., the SMS/MMS application 273, email application 280, health-care application, or environmental information application) to the external electronic device 102 or 104. Further, the notification relay application may receive notification information from the external electronic device and may provide the received notification information to the user.

The device management application may perform at least some functions of the external electronic device 102 or 104 communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

The applications 270 may include an application (e.g., a health-care application) designated depending on an attribute of the external electronic device (e.g., as an attribute of the electronic device, the type of electronic device is a mobile medical device).

The applications 270 may also include an application received from an external electronic device 102 or 104, and/or may include a preloaded application or a third party application downloadable from a server.

The names of the components of the program module 210 illustrated in FIG. 2 may vary depending on the type of OS.

At least a part of the program module 210 may be implemented in software, firmware, hardware, or a combination of two or more thereof. At least a part of the programming module 210 may be implemented (e.g., executed) by a processor (e.g., the AP 210). At least a part of the program module 210 may include a module, program, routine, set of instructions, process, etc., for performing one or more functions.

FIG. 3 illustrates a beacon managing module of an electronic device according to an embodiment of the present invention.

Referring to FIG. 3, the beacon managing module 180 includes a beacon signal receiving module 310, a communication module 330, a processing module 330, a storage module 340, and an obtaining module 350. The beacon managing module 180 may be provided separately from a processor (e.g., the processor 120) or may be fully or partially integrated with the processor.

The beacon signal receiving module 310 may receive beacon signals. For example, the beacon signal receiving module 310 may receive beacon signals from a beacon. When the electronic device 101 enters within an effective range of a signal transmission of the beacon, the beacon signal receiving module 310 may receive a beacon signal. The beacon signal receiving module 310 may receive a first beacon signal from a first beacon at a first time and a second beacon signal from a second beacon at a second time.

The communication module 330 may previously receive first beacon information for the first beacon and second beacon information for the second beacon from a server.

The storage module 340 may store (or cache) the received first beacon information for the first beacon and the received second beacon information for the second beacon.

The obtaining module 350 may obtain first movement information that is information on a movement of a user between the first time and the second time. The obtaining module 350 may obtain the first movement information from a sensor in the electronic device 101 or a processor that has processed data from the sensor. The first movement information may include at least one of the electronic device's velocity (or speed), distance (or displacement) or a user step count and vertical movement information between the first time and the second time. For example, the sensor or the processor that has processed data from the sensor may be a pedometer.

The processing module 330 may determine whether to process at least one of the first beacon signal and the second beacon signal based on the first movement information of the electronic device between the first time and the second time. That is, the processing module 330 may identify a location error of at least one of the first beacon and the second beacon.

The processing module 330 may determine a first time difference between the first time and the second time. The obtaining module 350 may obtain a first distance between the first beacon and the second beacon. The processing module 330 may determine a first speed based on the first time difference and the first distance.

The obtaining module 350 may obtain the first distance based on topographical information previously stored in the electronic device 101. The obtaining module 350 may receive the topographical information from a server in order to obtain the first distance, or may directly obtain the first distance from a server.

The processing module 330 may determine whether to process at least one of the first beacon signal and the second beacon signal based on a result of a comparison between the first speed and a first electronic device speed obtained from the first movement information.

The processing module 330 may determine at least one of the first beacon and the second beacon as a suspect beacon, when the first speed exceeds the first electronic device speed allowed for the electronic device.

The beacon signal receiving module 310 may receive a third beacon signal from a third beacon at a third time. The processing module 330 may identify a second time difference between the second time and the third time. The obtaining module 350 may obtain a second distance between the third beacon and the second beacon. The processing module 330 may identify a second speed based on the second time difference and the second distance. The processing module 330 may compare the second speed with a second electronic device speed obtained from second movement information of the electronic device between the second time and the third time. When the second speed is larger than the second electronic device speed, the processing module 330 may determine that the second beacon has an error and might not process the second beacon signal. When the second speed is less than or equal to the second electronic device speed, the processing module 330 may determine that the first beacon has an error and might not process the first beacon signal.

The processing module 330 may determine a third time difference between the first time and the third time. The obtaining module 350 may obtain a third distance between the third beacon and the first beacon. The processing module 330 may determine a third speed based on the third time difference and the third distance. The processing module 330 may compare the third speed with a third electronic device speed obtained from third movement information of the electronic device between the first time and the third time. The processing module 330 may determine whether to process at least one of the first beacon signal and the second beacon signal based on a result of the comparison between the second speed and the second electronic device speed and a result of the comparison between the third speed and the third electronic device speed.

The processing module 330 may determine a normal beacon (i.e., a beacon without an error) of the first beacon and the second beacon and determine that the other beacon has an error based on the result of comparison between the second speed and the second electronic device speed and the result of comparison between the third speed and the third electronic device speed.

When the first speed is greater than the first electronic device speed, the processing module 330 may determine that the second beacon has an error and might not process the second beacon signal.

The obtaining module 350 may compute the first distance or may receive the first distance from the outside. The obtaining module 350 may compute the second distance or may receive the second distance from the outside. The obtaining module 350 may compute the third distance or may receive the third distance from the outside.

The processing module 330 may determine whether to process at least one of the first beacon signal and the second beacon signal, based on whether there is an inter-floor difference between the first beacon and the second beacon and the vertical movement information obtained from the electronic device movement information.

The communication module 330 may receive first beacon information for the first beacon and second beacon information for the second beacon.

The storage module 340 may store reception histories of the first beacon signal and the second beacon signal.

The communication module 330 may transmit the determination as to whether to process at least one of the first beacon signal and the second beacon signal to a server.

The processing module 330 may perform a control to not process at least one of relevant information of the first beacon and relevant information of the second beacon, based on the determination as to whether to process at least one of the first beacon signal and the second beacon signal.

The processing module 330 may determine whether to process at least one of the first beacon signal and the second beacon signal, based on whether the first speed is included in a first range corresponding to the first movement information.

The beacon signal receiving module 310 may receive a third beacon signal from a third beacon at a third time. The processing module 330 may identify a second time difference between the second time and the third time. The obtaining module 350 may identify the second distance between the third beacon and the second beacon. The processing module 330 may determine the second speed based on the second time difference and the second distance. The processing module 330 may determine whether the second speed is included in a second range corresponding to the second movement information of the electronic device between the second time and the third time. The processing module 330 may determine if at least one of the first beacon and the second beacon has an error, based on whether the second speed is included in the second range.

The beacon information communication module 310 may receive a first beacon signal from a first beacon at a first time and a second beacon signal from a second beacon at a second time. The obtaining module 350 may obtain a first distance between the first beacon and the second beacon. The processing module 330 may determine whether to process at least one of the first beacon signal and the second beacon signal, based on a result of comparison between the time difference between the first time and the second time and a threshold set as per the first distance.

The beacon information communication module 310 may receive a first beacon signal from a first beacon at a first time and a second beacon signal from a second beacon at a second time. The obtaining module 350 may obtain whether there is an inter-floor difference between the first beacon and the second beacon. The processing module 330 may determine whether to process at least one of the first beacon signal and the second beacon signal, based on the time difference between the first time and the second time.

The beacon signal receiving module 310 may receive a plurality of different beacon signals. The obtaining module 350 may obtain movement information of the electronic device 101. The processing module 330 may determine whether to process each of a plurality of beacon signals, based on the respective reception times of the plurality of beacon signals and the obtained movement information.

FIG. 4 illustrates a server according to an embodiment of the present invention.

Referring to FIG. 4, a server 106 includes a storage module 410, a communication module 420, and a processing module 430.

The storage module 410 may store beacon information and relevant information. The beacon information may include at least one of a beacon logic identification (ID), a beacon name, a beacon ID, a beacon type, a tag, a security code, a beacon location, group information, and an owning company. The beacon logic ID may allow the server to identify a beacon. The beacon name may be a name assigned to identify a beacon. The beacon ID may be for identifying a beacon. The beacon type is for identifying a communication scheme in which the beacon performs communication, e.g., Bluetooth Low Energy (BLE)®, Wi-Fi®, or ANT®. The tag may be a tag or user tag determined per type and may indicate information, e.g., a restaurant, an exhibition, or an event. The security code may be a key value for encrypting or decoding a beacon signal. The beacon location may include at least one of two-dimensional coordinates and per-floor information of a beacon. The group information may be information on the group where a beacon belongs, e.g., the name of a department store or store information. The owning company information may denote information on the company owning a beacon. The relevant information may be information related to a beacon, such as marketing information.

The communication module 420 may transmit at least one of the beacon information and the relevant information to an electronic device. The communication module 420 may receive a beacon information request from the electronic device, and in response to the request, transmit at least one of the beacon information and the relevant information.

The communication module 420 may receive a request for providing a distance between the first beacon and the second beacon from the electronic device. In response to the request, the communication module 420 may transmit the distance between the first beacon and the second beacon to the electronic device. The communication module 420 may receive error information on the first beacon from the electronic device. The processing module 430 may update the beacon information on the first beacon, based on the error information.

The processing module 430 may delete the information on the first beacon or modify the information on the first beacon.

The communication module 420 may receive a beacon recognition log from each of a plurality of electronic devices. The processing module 430 may update the beacon information based on the received beacon recognition log.

FIG. 5 illustrates a beacon according to an embodiment of the present invention.

Referring to FIG. 5, the beacon 102 includes a processing module 510 and a beacon signal transmitting module 520.

The processing module 510 may generate a beacon signal, which may include at least one of a beacon type, transmission strength information, a beacon ID, a group ID, and a time stamp. The processing module 510 may encrypt a beacon signal. For example, when the beacon 102 uses BLE communication, the processing module 510 may generate a beacon signal using an advertisement packet following a BLE communication standard.

The beacon signal transmitting module 520 may transmit generated beacon signals at predetermined time intervals.

Figure 6:
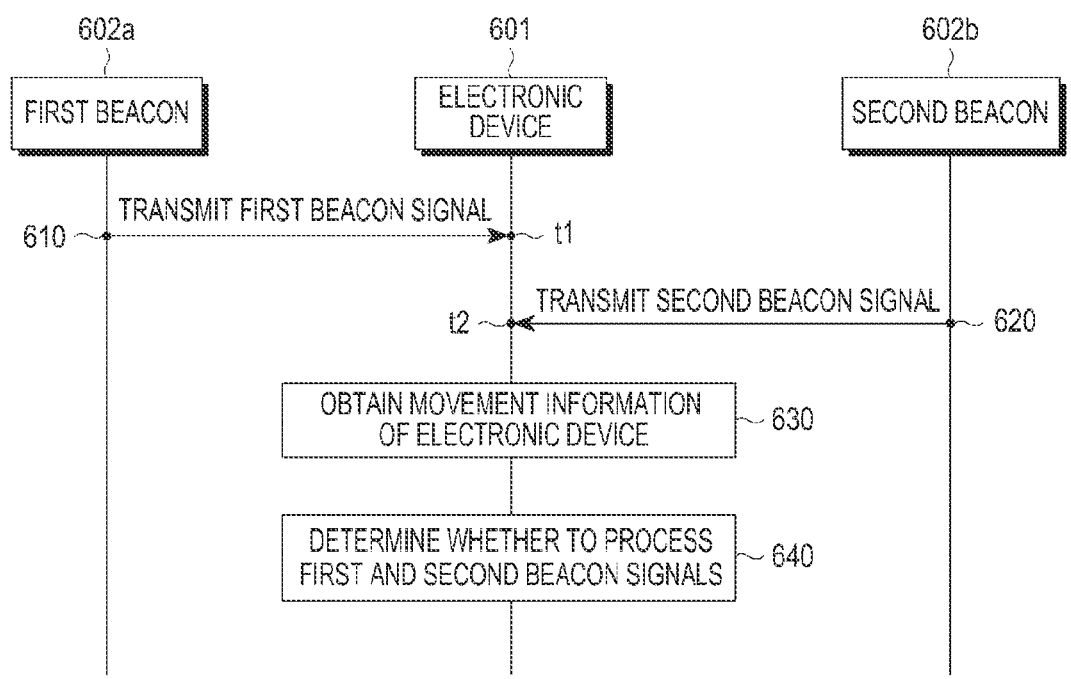
FIG. 6 is a signal flow diagram illustrating a beacon managing method according to an embodiment of the present invention.

FIG. 6 is a signal flow diagram illustrating a beacon managing method according to an embodiment of the present invention. Specifically, in the method illustrated in FIG. 6, an electronic device 601 receives beacon signals from two beacons 602a and 602b.

Referring to FIG. 6, in step 610, the first beacon 602a transmits a first beacon signal to the electronic device 601 at a first time t1.

In step 620, the second beacon 602b transmits a second beacon signal to the electronic device 601 at a second time t2.

For example, a user carrying the electronic device 601 may enter an effective range of a beacon signal from the first beacon 602a and may then enter an effective range a beacon signal from the second beacon 602b. Accordingly, the electronic device 601 may sequentially receive the first beacon signal and the second beacon signal at the first time t1 and the second time t2, respectively.

In step 630, the electronic device 601 obtains movement information of the electronic device 601. For example, the electronic device 601 may obtain first movement information corresponding to the user's movement information between the first time and the second time, e.g., from a sensor in the electronic device 601 or a processor that has processed data from the sensor. The first movement information may include at least one of a velocity (or speed), a distance (or displacement) or a step count and vertical movement information between the first time and the second time. For example, the sensor or the processor may be a pedometer.

In step 640, the electronic device 601 determines whether to process at least one of the first beacon signal and the second beacon signal, based on the first movement information. That is, the electronic device 601 may determine, based on the first movement information, whether at least one of the first beacon and the second beacon has an error. The error may be a location error, i.e., an error in which a position of the first beacon or the second beacon is different from a managed position.

Figure 7:
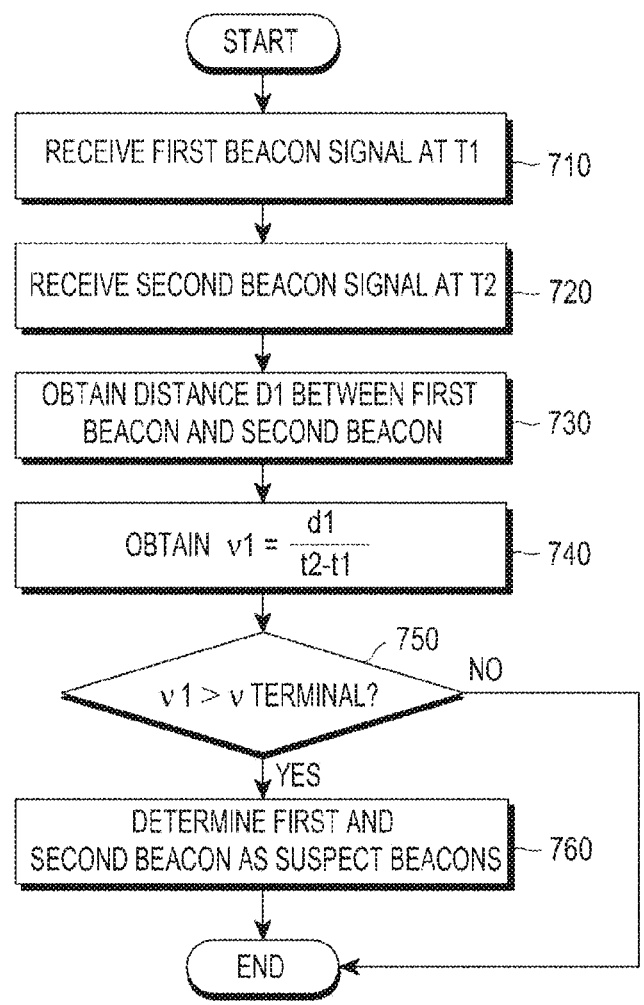
FIG. 7 is a flowchart illustrating a beacon managing method by an electronic device according to an embodiment of the present invention.

FIG. 7 is a flowchart illustrating a beacon managing method by an electronic device according to an embodiment of the present invention.

Figure 8A:
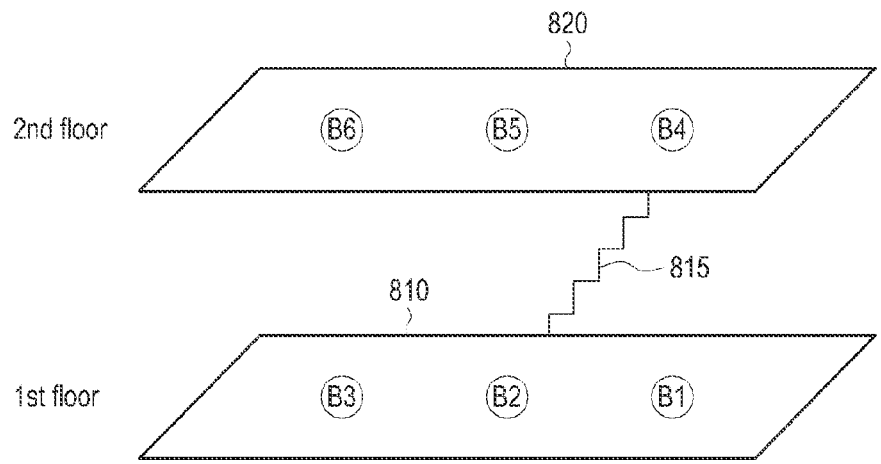
FIG. 8A illustrates beacon topology managed by a server or an electronic device.
Figure 8B:
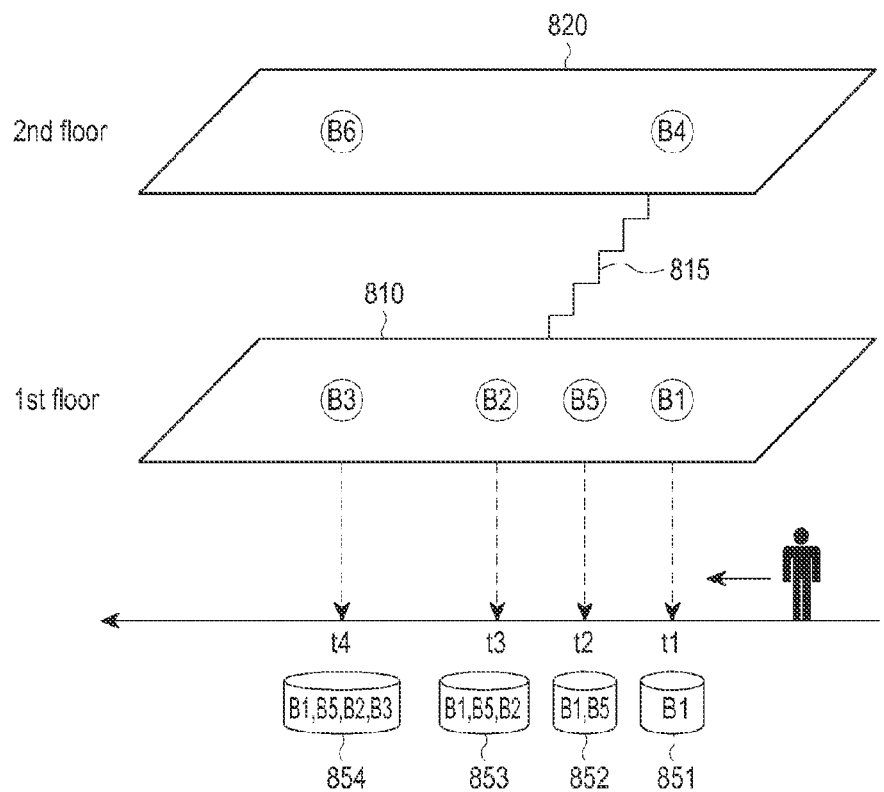
FIG. 8B illustrates an actual beacon topology.
Figure 9:
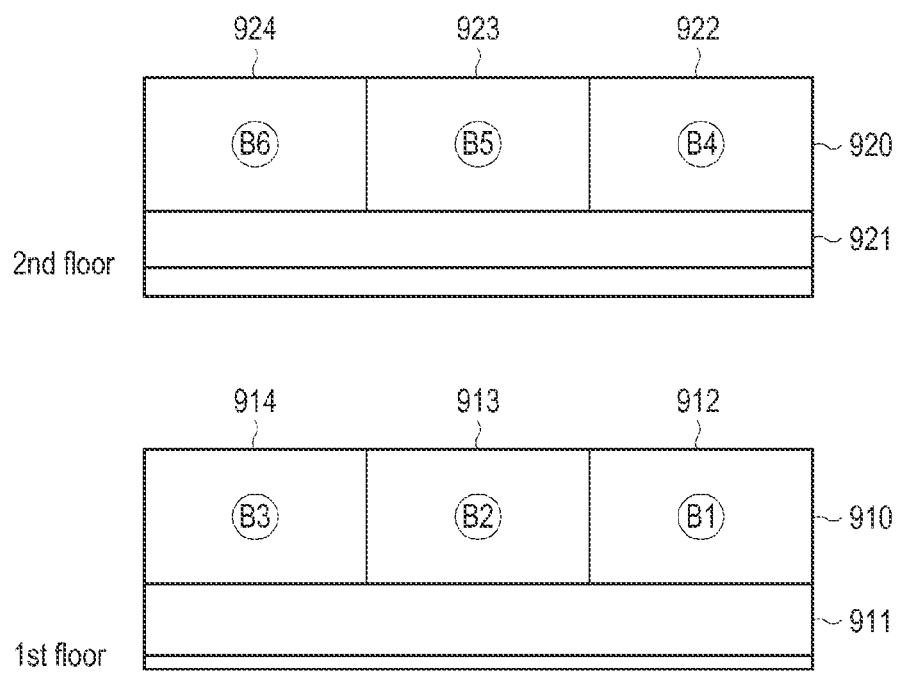
FIG. 9 illustrates topology information according to an embodiment of the present invention.

FIG. 8A illustrates beacon topology managed by a server or an electronic device, e.g., information regarding a beacon as stored in the server or the electronic device, FIG. 8B illustrates an actual beacon topology, e.g., information regarding an actual position of a beacon, and FIG. 9 illustrates topology information according to an embodiment of the present invention.

Referring to FIG. 7, in step 710, the electronic device receives a first beacon signal from a first beacon B1 at a first time t1, e.g., as illustrated in FIG. 8B. The electronic device may store a beacon signal reception history 851.

In step 720, the electronic device receives a second beacon signal from a second beacon B5 at a second time t2, e.g., as illustrated in FIG. 8B. The electronic device may store a beacon signal reception history 852.

In step 730, the electronic device obtains a first distance d1 between the first beacon B1 and the second beacon B5. For example, the first distance d1 may be a distance for moving from the first beacon B1 to the second beacon B5, or may be a distance on beacon topology managed by a server or the electronic device. The managed beacon topology includes information indicating that the first beacon B1 is located on a first floor 810 and that the second beacon B5 is located on a second floor 820, as illustrated in FIG. 8A. Accordingly, the first distance d1 may be a sum of a distance between the first beacon B1 and a stairway 815, a distance of the stairway 815, and a distance between the stairway 815 and the second beacon B5.

The electronic device may receive and store beacon topology managed by a server. In such case, the electronic device may obtain the first distance d1 from the stored, managed beacon topology.

Alternatively, the electronic device may send a request for beacon topology to a server and may receive the beacon topology from the server. In this case, the electronic device may obtain the first distance d1 from the received, managed beacon topology.

The electronic device may send a request for the first distance d1 to the server and receive the first distance d1. For example, the electronic device may send a first distance request including IDs of the first beacon B1 and the second beacon B5 to the server. The server may obtain the first distance d1 for the electronic device in response to the received first distance request, and the electronic device may obtain the first distance d1 from the server.

At least one of the electronic device and the server may include topological information, e.g., as illustrated in FIG. 9.

Referring to FIG. 9, the topological information includes per-floor planar configuration information. The topological information includes information indicating that a walk way 911 and first to third stores 912 to 914 are arranged on the first floor 910 and an arrangement relationship. Further, the topological information includes information indicating that a walk way 921 and fourth to sixth stores 922 to 924 are arranged on the second floor 920 and an arrangement relationship. Further, the topological information also includes information on an arrangement of beacons on each floor.

At least one of the electronic device and the server may obtain the first distance based on the topological information.

In step 740, the electronic device determines a first speed v1 from the first distance d1. The electronic device determines a first time difference (Δt1) based on a second time t2 and a first time t1. The electronic device determines the first speed v1, based on the first time difference (Δt1) and the first distance d1. For example, the electronic device may determine the first speed v1 using Equation (1).

$$v1 = \frac{d1}{t2 - t1} \quad (1)$$

The first speed v1 determined by the electronic device is a speed in the managed beacon topology.

In step 750, the electronic device compares the first speed v1 and an electronic device speed (vterminal), i.e., determines which is larger or smaller.

As described above, the electronic device may obtain the electronic device speed (vterminal) from first movement information. For example, the electronic device may obtain a mean speed of the electronic device between the first time t1 and the second time t2 from a sensor included in the electronic device or from a processor processing data from the sensor. The electronic device may also obtain a moving state of the electronic device between the first time t1 and the second time t2. For example, the moving state may include a walk state, a run state, or a climb state.

Further, a speed corresponding to each state may be previously determined. For example, when the moving state is a walk state, the speed may be previously determined as 4 km/h. The electronic device may obtain the electronic device speed based on the speed corresponding to the moving state or the mean speed. Here, the electronic device speed (vterminal) between the first time t1 and the second time t2 may be referred to as a first electronic device speed.

In step 760, the electronic device 101 determines if the first beacon or the second beacon is a suspect beacon, when the first speed v1 exceeds the electronic device speed (vterminal). Here, the term "suspect beacon" may refer to a beacon whose location is determined to be different from an initially set location, i.e., a beacon that has been improperly moved or moved without updating the movement in the server.

For example, as illustrated in FIG. 8B, the second beacon B5 is actually located on the first floor 810, not the second floor 820, different from information provided in the managed beacon topology. In this case, the electronic device has actually moved from the location of the first beacon B1 in FIG. 8B to the location of the second beacon B5 for the first time difference (Δt1). Accordingly, the obtained first electronic device speed may be a value obtained by dividing the displacement between the first beacon B1 and the second beacon B5 in FIG. 8B with the first time difference (Δt1).

However, the first speed v1 determined from a point of view of the managed beacon topology may be a value obtained by dividing a sum of the distance between the first beacon B1 and the stairway 815, the distance of the stairway 815, and the distance between the stairway 815 and the second beacon B5 in FIG. 8A with the first time difference (Δt1).

Accordingly, because the first speed v1 will be larger than the first electronic device speed, the electronic device may identify at least one of the first beacon B1 and the second beacon B5 as a suspect beacon.

Figure 10:
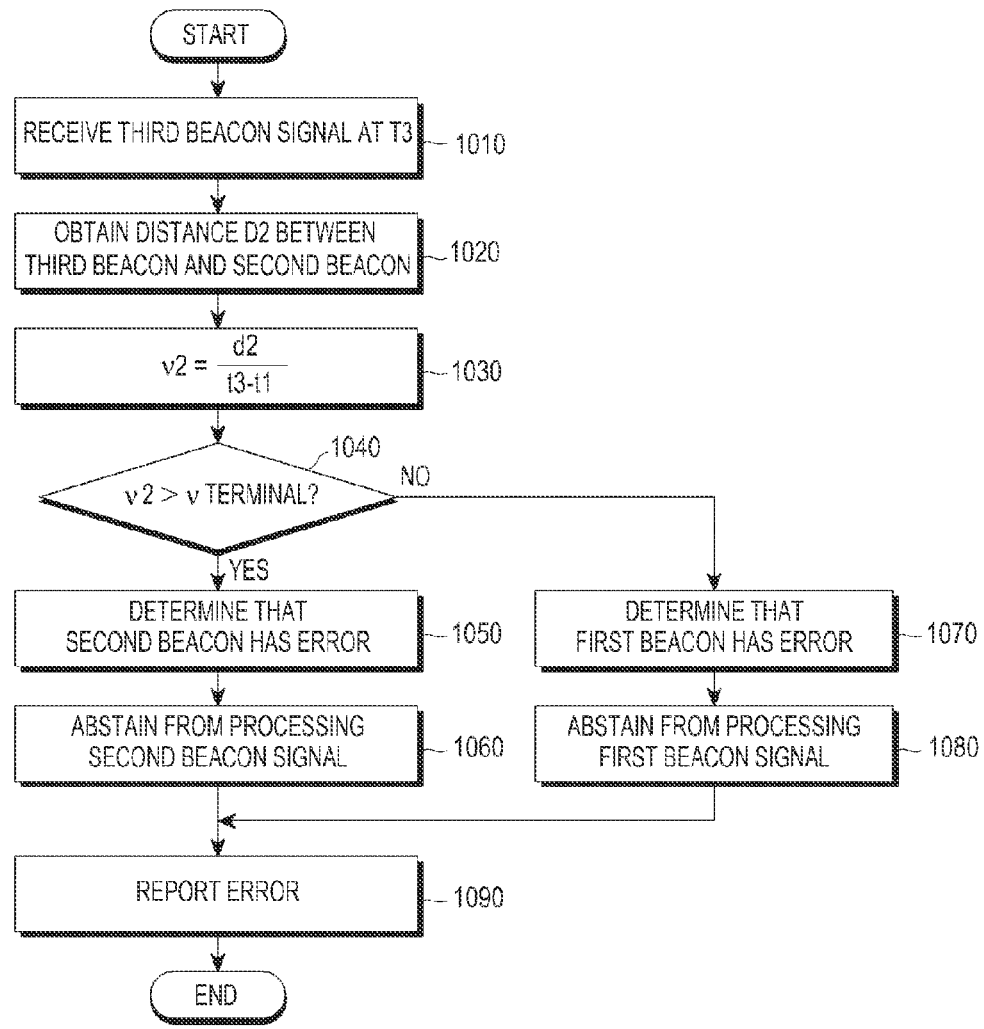
FIG. 10 is a flowchart illustrating a beacon managing method according to an embodiment of the present invention.

FIG. 10 is a flowchart illustrating a beacon managing method according to an embodiment of the present invention. For example, the beacon managing method illustrated in FIG. 10 may be performed after the beacon managing method illustrated in FIG. 7 has been performed.

Referring to FIG. 10, in step 1010, the electronic device receives a third beacon signal from a third beacon B2 at a third time t3, e.g., as illustrated in FIG. 8B. The electronic device may store a beacon signal reception history 853.

In step 1020, the electronic device obtains a second distance d2 between the third beacon B2 and the second beacon B5. Here, the second distance d2 may be a distance for moving from the third beacon B2 to the second beacon B5, or may be a distance based on beacon topology managed by the server or the electronic device. The managed beacon topology, as illustrated in FIG. 8A, includes information indicating that the third beacon B2 is located on the first layer 810 and the second beacon B5 is located on the second layer 820. Accordingly, the second distance d2 may be a sum of a distance between the third beacon B2 and the stairway 815, a distance of the stairway 815, and a distance between the stairway 815 and the second beacon B5.

As described above, the electronic device may obtain the second distance d2 from the stored, managed beacon topology, or the electronic device may send a request for beacon topology to the server and may receive the beacon topology from the server in order to obtain the second distance d2. The electronic device may also send a request for the second distance d2 to the server and receive the second distance d2 from the server.

In step 1030, the electronic device determines a second speed v2 from the second distance d2. The electronic device may determine a second time difference (Δt2) based on a third time t3 and a second time t2. The electronic device may determine the second speed v2 based on the second time difference (Δt2) and the second distance d2. For example, the electronic device may determine the second speed v2 using Equation (2).

$$v2 = \frac{d2}{t3 - t2} \quad (2)$$

The second speed v2 determined by the electronic device is a speed in the managed beacon topology.

In step 1040, the electronic device determines if the second speed v2 is larger than a electronic device speed (vterminal). The electronic device may obtain its movement information between the third time t3 and the second time t2. The electronic device movement information between the third time t3 and the second time t2 may be referred to as second movement information.

As described above, the electronic device may obtain the electronic device speed (vterminal) from the second movement information. Specifically, the electronic device may obtain a mean speed of the electronic device between the third time t3 and the second time t2 from a sensor included in the electronic device or a processor processing data from the sensor. The electronic device may obtain a moving state of the electronic device 101 between the third time t3 and the second time t2. The electronic device may obtain the electronic device speed based on the speed corresponding to the moving state or the mean speed. Here, the electronic device speed (vterminal) between the third time t3 and the second time t2 is referred to as a second electronic device speed.

In step 1040, the electronic device determines whether the second speed v2 exceeds the second electronic device speed.

In step 1050, when the second speed v2 exceeds the second electronic device speed (vterminal), the electronic device determines that the second beacon B5 has an error, i.e., is incorrectly positioned, as illustrated in FIG. 8B.

In step 1060, the electronic device abstains from processing the second beacon signal received from the second beacon B5 determined to have the error.

In step 1070, when the second speed v2 is not more than the second electronic device speed, the electronic device determines that the first beacon B1 has an error, i.e., is incorrectly positioned.

In step 1080, the electronic device abstains from processing the first beacon signal received from the first beacon B1 determined to have the error.

In step 1090, the electronic device reports the error to the server.

Accordingly, the server may share the error information with other electronic devices, and the other electronic devices may abstain from processing the second beacon signal from the second beacon B5.

Figure 11:
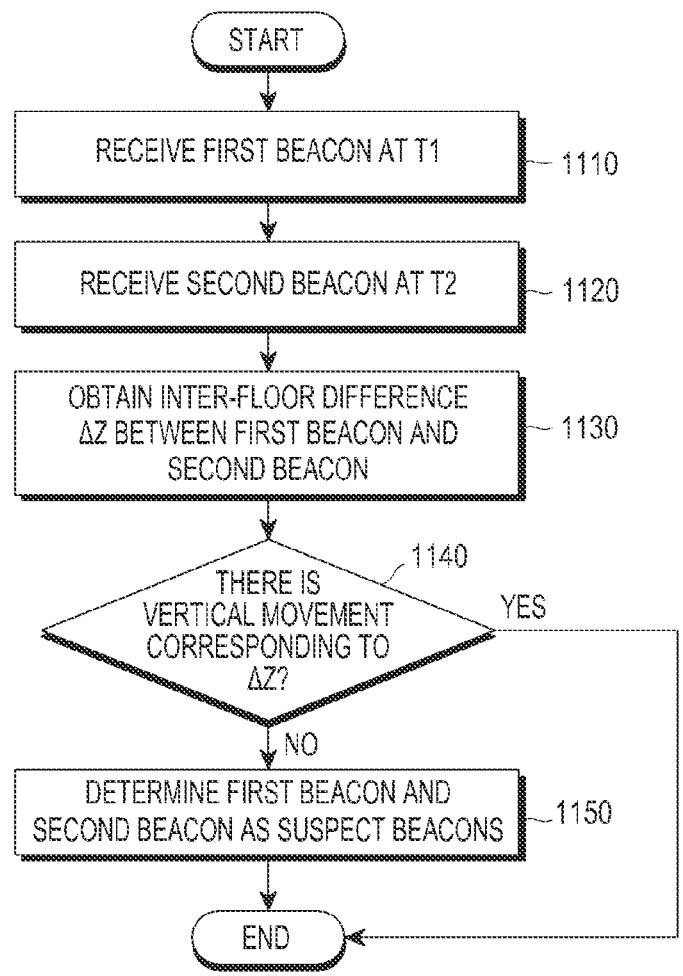
FIG. 11 is a flowchart illustrating a beacon managing method by an electronic device according to an embodiment of the present invention.

FIG. 11 is a flowchart illustrating a beacon managing method by an electronic device according to an embodiment of the present invention.

Referring to FIG. 11, in step 1110, the electronic device receives a first beacon signal from a first beacon B1 at a first time t1, as illustrated in FIG. 8B. The electronic device 101 may store a beacon signal reception history 851.

In step 1120, the electronic device receives a second beacon signal from a second beacon B5 at a second time t2, as illustrated in FIG. 8B. The electronic device 101 may store a beacon signal reception history 852.

In step 1130, the electronic device obtains an inter-floor difference (Δz) between the first beacon B1 and the second beacon B5. Here, the inter-floor difference (Δz) may be a difference between the floor 810 on which the first beacon B1 is located and the floor 820 on which the second beacon B5 is located. Further, the inter-floor difference (Δz) may be a distance on beacon topology managed by the server or the electronic device. As described above, in FIG. 8A, the managed beacon topology includes information indicating that the first beacon B1 is located on a first floor 810 and the second beacon B5 is located on a second floor 820. Thus, the inter-floor difference (Δz) may be a difference of one floor.

In step 1140, the electronic device determines whether there is a vertical movement of the electronic device corresponding to the inter-floor difference (Δz). As described above, the electronic device may obtain the first movement information from a sensor in the electronic device or a processor that has processed data from the sensor. The electronic device may determine whether there has been a vertical movement from the first movement information.

In FIG. 8B, the user has only moved on the first floor 830, and thus, the first movement information indicates that there is no vertical movement.

In step 1150, when it is determined that there is no vertical movement of the electronic device corresponding to the inter-floor difference (Δz), the first beacon B1 and the second beacon B5 are determined to be suspect beacons.

Further, the electronic device, thereafter, receives a third beacon signal from a third beacon B2 at a third time t3 and determines a beacon having an error based on a result of the comparison between an inter-floor difference between the third beacon B2 and the second beacon B2 and a vertical movement difference of the electronic device 101 for a second time difference. For example, as illustrated in FIG. 8A, the inter-floor difference between the third beacon B2 and the second beacon B5 should be one floor, but because there is no vertical movement difference of the electronic device for the second time difference, as illustrated in FIG. 8B, the electronic device may determine that the second beacon B5 has an error.

Although not illustrated in FIGS. 8A and 8B, it can be easily appreciated by one of ordinary skill in the art that if there was a vertical movement of the electronic device corresponding to the inter-floor difference for the second time difference, the electronic device would determine that the first beacon B1 has an error.

In the above-described embodiments, the electronic device detects a beacon having an error, i.e., being located in an incorrect position, through speed-based comparison or through inter-floor comparison. However, according to another embodiment of the present disclosure, the electronic device may also detect a beacon having an error considering both a speed and an inter-floor difference.

Figure 12:
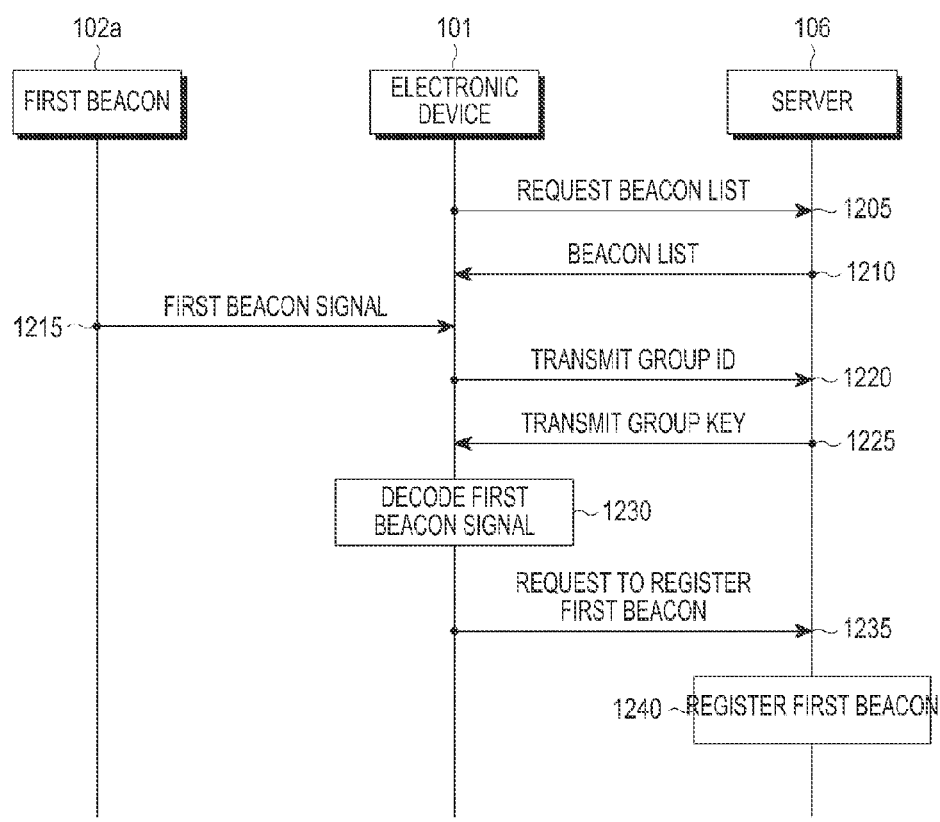
FIG. 12 is a signal flow diagram illustrating a beacon registration procedure according to an embodiment of the present invention.

FIG. 12 is a signal flow diagram illustrating a beacon registration procedure according to an embodiment of the present invention.

Referring to FIG. 12, in step 1205, the electronic device 101 sends a request for a beacon list to the server 106. Here, the beacon list includes at least one of beacon information and relevant information.

In step 1210, the server 106 transmits a beacon list to the electronic device 101, in response to the request for the beacon list from the electronic device 101.

In step 1215, the electronic device 101 receives a first beacon signal from a first beacon 102a. For example, the first beacon signal may be a BLE-based advertisement signal that is encrypted according to a predetermined encryption scheme. For example, the first beacon signal may be encrypted as per a onetime-password scheme. Accordingly, a K value obtained by applying a Hash function for a time stamp and a group key from the first beacon signal may be obtained. Further, a beacon identification and an encryption connection (ENC) Parameter value in which the K value has been encrypted may be acquired. The first beacon signal may have the group identification, time stamp, and ENC value.

In step 1220, the electronic device 101 transmits a group ID for the corresponding group to the server 106.

In step 1225, the server 106 transmits a group key corresponding to the group ID to the electronic device 101.

In step 1230, the electronic device 101 decodes the first beacon signal using the received group key. The electronic device 101 may obtain K', which is a result obtained by applying the Hash function for the time stamp and the group key. The electronic device 101 may decode the ENC value and K' value to obtain the beacon ID. The electronic device 101 may determine whether the obtained beacon ID is present in an existing beacon list.

When the obtained beacon ID is not present in the existing beacon list, the electronic device 101, in step 1235, requests the server 106 to register the first beacon 102a. The registration request from the electronic device 101 may include at least one of an identification of the first beacon 102a, a group identification, a reception time difference (T0=current time-time of time stamp), and a beacon location (at least one of two-dimensional coordinates and per-floor information).

When the beacon location may be located indoors or outdoors, the electronic device 101 may receive three-dimensional coordinates associated with the beacon from the outside and transfer the same to the server 106. When the beacon location is located indoors, the electronic device 101 may obtain positioning data through a Wi-Fi map and may transfer the same to the server 106.

In step 1240, the server 106 registers the first beacon 102a in a beacon list, e.g., based on the information included in a first beacon registration request.

Further, the server 106 may identify group information and creator-related information and may also register the same in the beacon list. Here, the creator-related information may be identification information of the electronic device 101 or the user of the electronic device 101.

Figure 13:
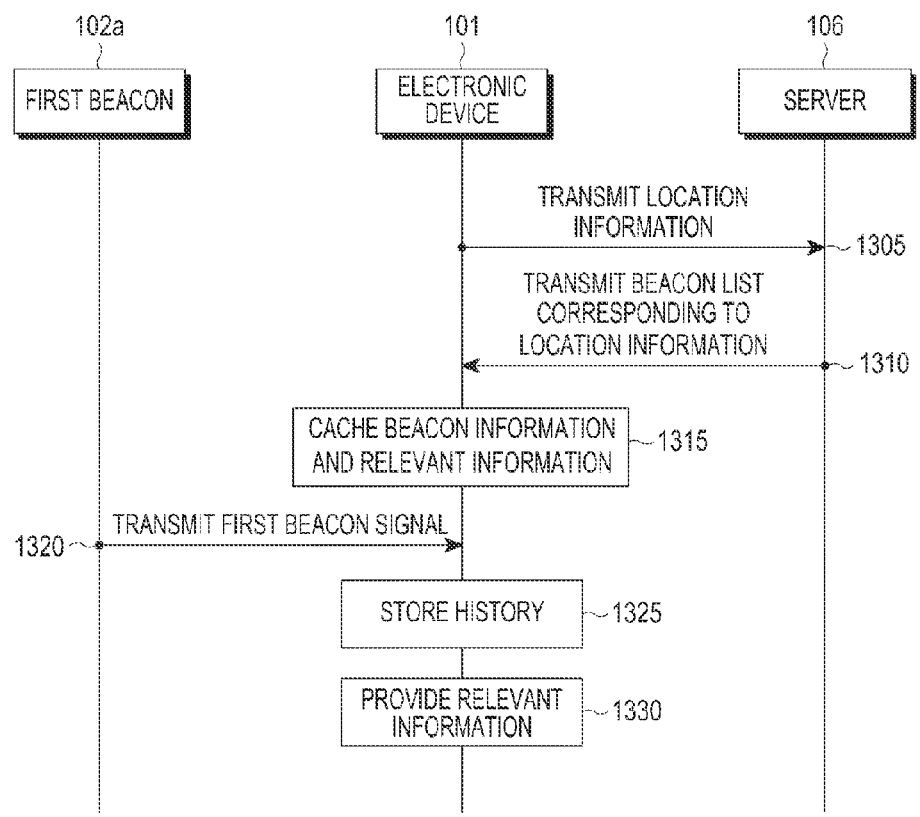
FIGS. 13 to 14 are signal flow diagrams illustrating beacon managing methods according to embodiments of the present invention.

FIG. 13 is a signal flow diagram illustrating a beacon managing method according to an embodiment of the present invention.

Referring to FIG. 13, in step 1305, the electronic device 101 transmits location information of the electronic device 101 to the server 106. The electronic device 101 may include a location determining module, such as a GPS module that may determine an arrangement location, and may obtain location information of the electronic device 101.

In step 1310, the server 106 transmits a beacon list corresponding to the location information to the electronic device 101. For example, the server 106 may identify a beacon group corresponding to the location information and transmit the beacon list of the beacon group to the electronic device 101.

In step 1315, the electronic device 101 stores (or caches) at least one of the beacon information and relevant information of the received beacon list.

In step 1320, the electronic device 101 receives a first beacon signal from a first beacon 102a at a first time.

In step 1325, the electronic device 101 stores a beacon signal reception history indicating that the first beacon has been received at the first time.

In step 1330, the electronic device 101 provides relevant information corresponding to the first beacon signal.

Figure 14:
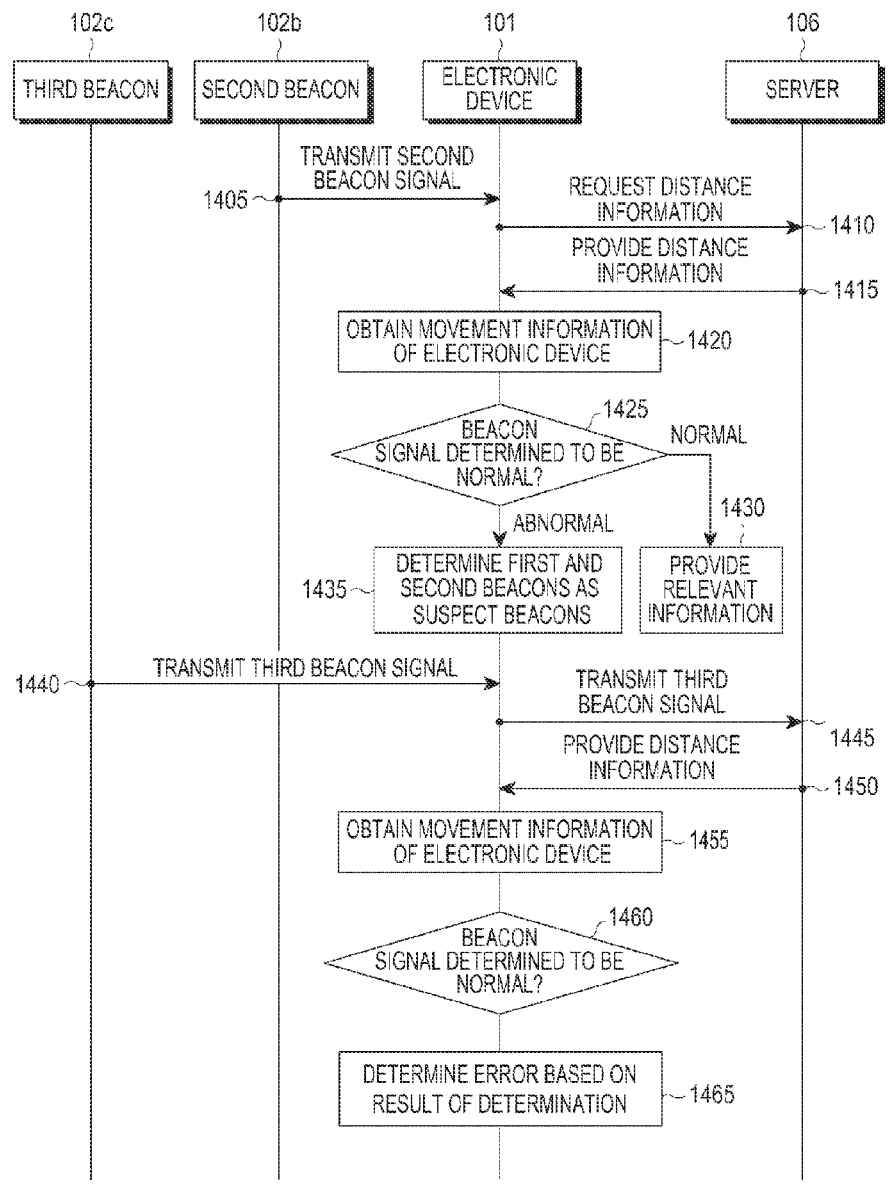

FIG. 14 is a signal flow diagram illustrating a beacon managing method according to an embodiment of the present invention. For example, the beacon managing method illustrated in FIG. 14 may be performed after the beacon managing method illustrated in FIG. 13 has been performed.

Referring to FIG. 14, in step 1405, the electronic device 101 receives a second beacon signal from a second beacon 102b. The electronic device 101 may receive the second beacon signal after receiving the first beacon signal. Further, in this case, the electronic device 101 might not immediately provide the relevant information corresponding to the second beacon signal.

In step 1410, the electronic device 101 sends a request for information on a distance between the first beacon 102a and the second beacon 102b to the server 106.

In step 1415, the server 106 transmits the distance information between the first beacon 102a and the second beacon 102b to the electronic device 101. As described above, alternatively, the electronic device 101 may obtain the distance information on its own.

In step 1420, the electronic device 101 obtains movement information of the electronic device 101.

In step 1425, the electronic device 101 determines whether a beacon signal is normal, based on at least one of the obtained movement information and distance information. As described above, the electronic device 101 may determine whether the beacon signal is normal, based on a result of a comparison between speed information obtained from the distance information and electronic device speed information obtained from the movement information. Alternatively, the electronic device 101 may determine whether the beacon signal is normal, based on a result of a comparison between the inter-floor difference information obtained from the distance information and the vertical movement information of the electronic device 101 obtained from the movement information.

In step 1430, when the beacon signal is determined to be normal, the electronic device 101 provide (e.g., display) relevant information corresponding to the second beacon signal.

In step 1435, when the beacon signal is determined to be abnormal, the electronic device 101 determines that the first beacon 102a and the second beacon 102b are suspect beacons.

In step 1440, the electronic device 101 receives a third beacon signal from a third beacon 102c.

In step 1445, the electronic device 101 sends a request for distance information between the third beacon 102c and the second beacon 102b to the server 106.

In step 1450, the server 106 transmits the distance information between the third beacon 102c and the second beacon 102b to the electronic device 101. As described above, alternatively, the electronic device 101 may obtain distance information on its own.

In step 1455, the electronic device 101 obtains movement information of the electronic device 101.

In step 1460, the electronic device 101 determines whether the beacon signal is normal, based on at least one of the obtained movement information and distance information.

In step 1465, the electronic device 101 determines that at least one of the first beacon 102a (as illustrated in FIG. 13) and the second beacon 102b is a beacon having an error, based on a result of the determination.

Figure 15:
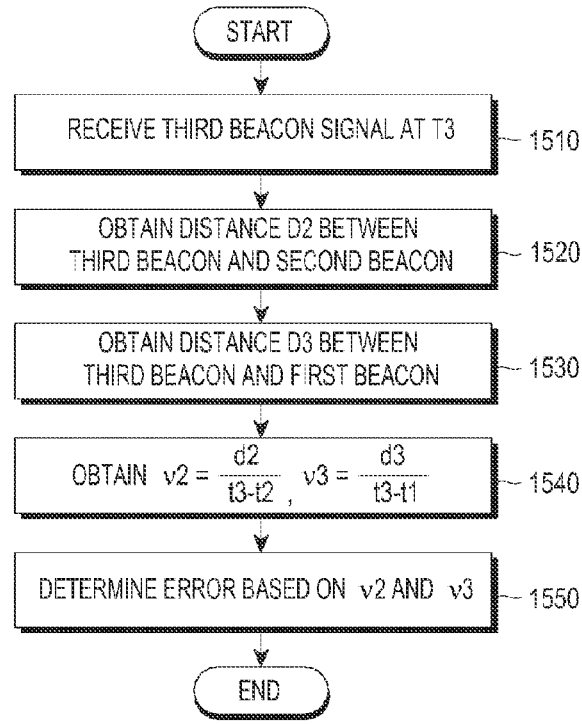
FIG. 15 is flowchart illustrating a beacon managing method according to an embodiment of the present invention.

FIG. 15 is a flowchart illustrating a beacon managing method according to an embodiment of the present invention. For example, the beacon managing method illustrated in FIG. 15 may be performed after the beacon managing method illustrated in FIG. 7 has been performed. That is, after the first beacon and the second beacon have been determined to be suspect beacons, the method illustrated in FIG. 15 may be performed.

Figure 16:
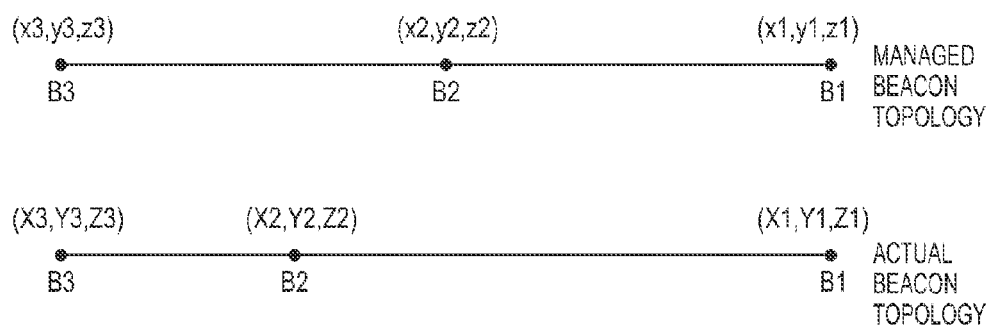
FIG. 16 illustrates an actual beacon topology and a managed beacon topology according to an embodiment of the present invention.

FIG. 16 illustrates actual beacon topology and managed beacon topology according to an embodiment of the present invention.

Referring to FIG. 16, beacon topology managed by the electronic device 101 or the server 106 indicates that a first beacon B1 is located at (x1,y1,z1), a second beacon B2 is located at (x2,y2,z2), and a third beacon B3 is located at (x3,y3,z3). However, in actual beacon topology, the first beacon B1, the second beacon B2, and the third beacon B3, respectively, are located at (X1,Y1,Z1), (X2,Y2,Z2), and (X3,Y3,Z3). In the example illustrated in FIG. 16, the second beacon B2 has moved, i.e., the second beacon B2 has an error.

Referring to FIG. 15, in step 1510, the electronic device receives a third beacon signal from the third beacon B3 at a third time t3.

In step 1520, the electronic device obtains a second distance d2 between the third beacon B3 and the second beacon B2. Here, the second distance d2 may be a distance for moving from the third beacon B2 to the second beacon B2.

In step 1530, the electronic device obtains a third distance d3 between the third beacon B3 and the first beacon B1. Here, the third distance d3 may be a distance for moving from the third beacon B3 to the first beacon B1.

In step 1540, the electronic device obtains a second speed v2 and a third speed v3. For example, the third speed v3 may be obtained using Equation (3).

$$v3 = \frac{d3}{t3-t1} \quad (3)$$

In step 1550, the electronic device determines an error based on the second speed v2 and the third speed v3.

Specifically, the electronic device may compare the second speed v2 with a second electronic device speed. Further, the electronic device may compare the third speed v3 with a third electronic device speed. The electronic device 101 may determine a beacon that is normal based on the result of the comparison.

For example, when the third speed v3 is equal to the third electronic device speed, the electronic device may determine that the first beacon B1 is a normal beacon. Further, the electronic device may determine that the beacon, the second beacon B2, which is not classified as the normal beacon, may have an error.

In FIG. 16, for a distance between the third beacon B3 and the first beacon B1, the distance on the managed beacon topology is the same as the actual distance. Accordingly, the electronic device may determine that the third speed v3 is the same as the third electronic device speed. As used herein, the term "the same" may include cases where the difference between the speeds is less than a predetermined threshold.

As a result of the determination, the first beacon B1 and the second beacon B2 may both be determined to have errors. In such a case, the electronic device may operate based on a multi-error action rule.

The multi-error action rule may include at least one of stopping servicing all of beacons having multiple errors, deleting a beacon that has an error and that abstains from providing only information related to corresponding to an erroneous beacon, and/or stopping servicing relevant information for the whole group to which the beacons correspond.

As described above, the electronic device may compare a latest received beacon signal with a beacon signal received a few steps earlier, while abstaining from only comparing the latest received beacon signal with a beacon signal received immediately before in the beacon signal reception history.

Figure 17:
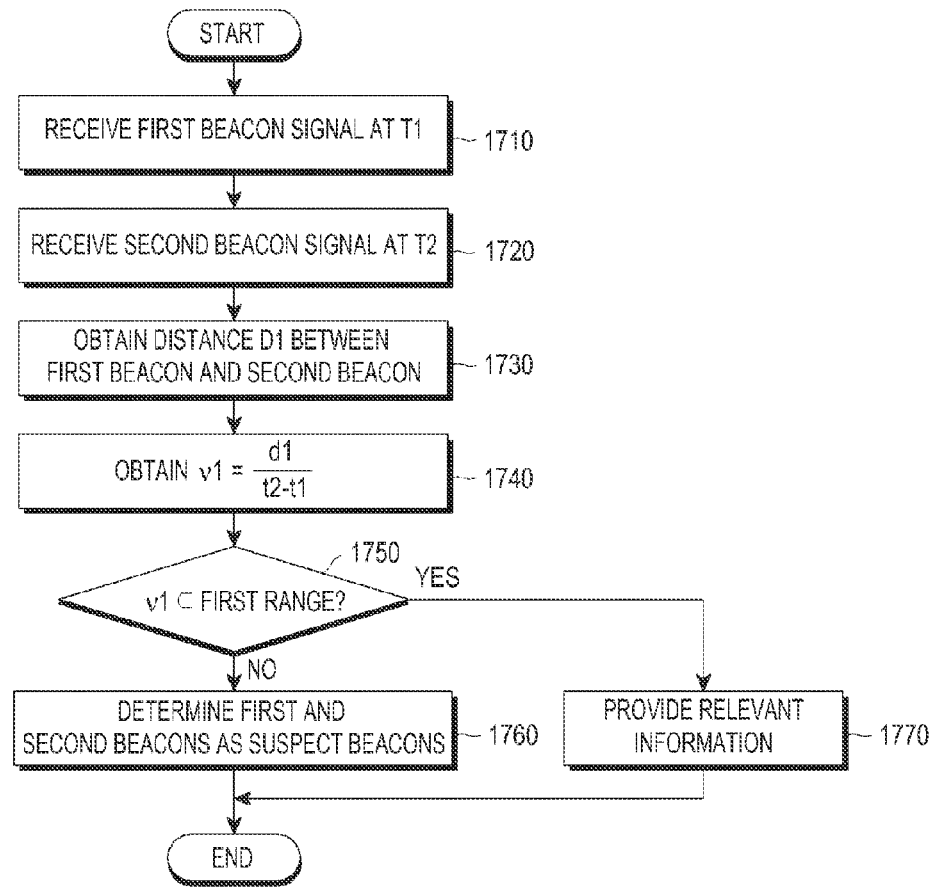
FIG. 17 is a flowchart illustrating a beacon managing method according to an embodiment of the present invention.

FIG. 17 is a flowchart illustrating a beacon managing method according to an embodiment of the present invention.

Figure 18:
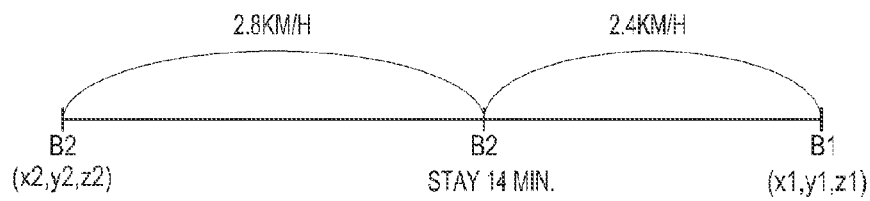
FIG. 18 illustrates movement of an electronic device in an actual beacon topology.

FIG. 18 illustrates movement of an electronic device in actual beacon topology.

Referring to FIGS. 17 and 18, in step 1710, the electronic device receives a first beacon signal from a first beacon B1 at a first time t1. The electronic device may store a beacon signal reception history.

In step 1720, the electronic device receives a second beacon signal from a second beacon B2 at a second time t2. The electronic device may store a beacon signal reception history.

In step 1730, the electronic device obtains a first distance d1 between the first beacon B1 and the second beacon B2. Here, the first distance d1 may be a distance for moving from the first beacon B1 to the second beacon B2. Further, the first distance d1 may be a distance on beacon topology managed by a server or the electronic device.

The electronic device may receive and store beacon topology managed by the server. In such a case, the electronic device may obtain the first distance d1 from the stored, managed beacon topology.

Alternatively, the electronic device may send a request for beacon topology to the server and receive the beacon topology from the server. In this case, the electronic device may obtain the first distance d1 from the received, managed beacon topology.

The electronic device may send a request for the first distance d1 to the server and receive the first distance d1 from the server. For example, the electronic device may send a first distance request including identifications of the first beacon B1 and the second beacon B2 to the server. The server may obtain the first distance d1 for the electronic device in response to the received first distance request, and the electronic device may obtain the first distance d1 from the server.

In step 1740, the electronic device determines a first speed v1 from the first distance d1. The electronic device may determine a first time difference (Δt1) based on a second time t2 and a first time t1. The electronic device 101 may determine the first speed v based on the first time difference (Δt1) and the first distance d1. The first speed v1 determined by the electronic device is a speed in the managed beacon topology.

In step 1750, the electronic device determines whether the first speed v1 is included in a first range corresponding to the electronic device speed (vterminal). The electronic device may obtain movement information of the electronic device 101 as illustrated in FIG. 18.

In FIG. 18, it is assumed that the first distance d1 is 520 m and that the electronic device moves 240 m at 2.4 km/h from the first beacon B1, stays fourteen minutes, and moves 280 m at 2.8 km/h. A sensor, such as a pedometer, or a processor processing data from the sensor in the electronic device may obtain movement information indicating that it takes the electronic device 26 minutes to move 520 m. Accordingly, the electronic device may obtain information indicating that the terminal speed (e.g., a mean speed) is 1.21 cm/h.

The electronic device may set a first range corresponding to the terminal speed (e.g., 1.2 km/h). The electronic device may set a first range having a predetermined deviation (e.g., 0.2 km/h) with respect to the electronic device speed (e.g., 1.21 km/h). For example, the electronic device may set the first range from 1 km/h to 1.4 km/h.

The electronic device may determine whether the first speed v1 belongs to the first range to determine whether the beacon has an error. For example, when the first speed v1 is smaller or larger than the first range, at least one of the first beacon B1 and the second beacon B2 is determined as a suspect beacon in step 1760.

However, when the first speed v1 is included within the first range, the electronic device provides relevant information corresponding to the second beacon B2 in step 1770.

Figure 19:
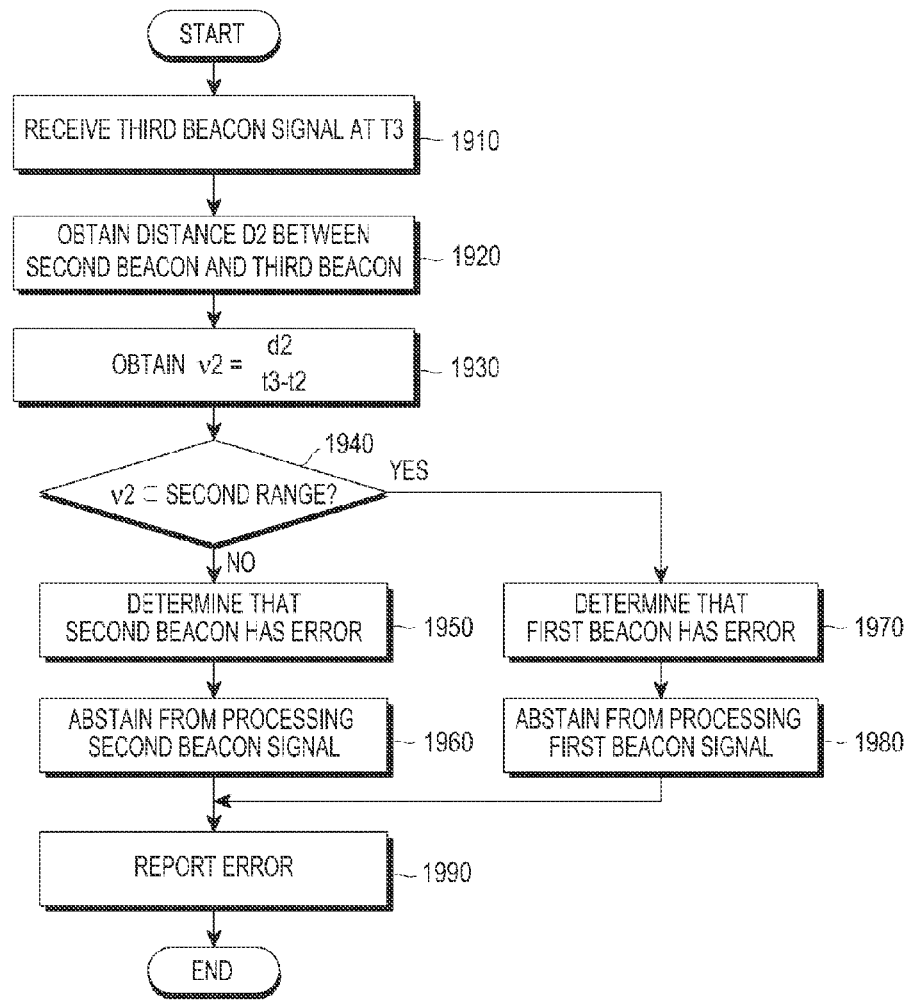
FIG. 19 is a flowchart illustrating a beacon managing method according to an embodiment of the present invention.

FIG. 19 is a flowchart illustrating a beacon managing method according to an embodiment of the present invention. For example, the beacon managing method illustrated in FIG. 19 may be performed after the beacon managing method illustrated in FIG. 17 has been performed.

Figure 20:
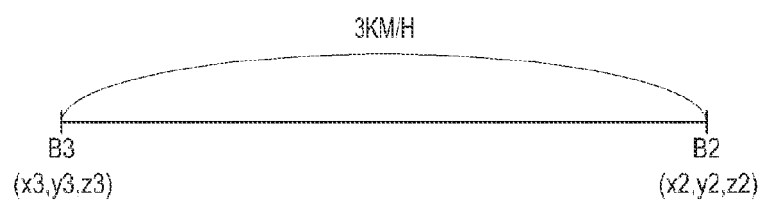
FIG. 20 illustrates movement of an electronic device in an actual beacon topology.

FIG. 20 illustrates movement of an electronic device in an actual beacon topology.

Referring to FIG. 19, in step 1910, the electronic device receives a third beacon signal from a third beacon B3 at a third time t3. The electronic device 101 may store a beacon signal reception history.

In step 1920, the electronic device obtains a second distance d2 between the third beacon B3 and the second beacon B2. As illustrated in FIG. 20, the second distance d2 is a distance for moving from the third beacon B3 to the second beacon B2, e.g., 300 m.

In step 1930, the electronic device determines the second speed v2 from the second distance d2. The electronic device 101 may determine a second time difference (Δt2) based on a third time t3 and a second time t2. The electronic device 101 may determine the second speed v2 based on the second time difference (Δt2) and the second distance d2. The second speed v2 determined by the electronic device 101 is a speed in the managed beacon topology.

In step 1940, the electronic device determines whether the second speed v2 falls into the second range.

In FIG. 20, the electronic device may obtain information indicating that the terminal speed is 3 km/h as illustrated in FIG. 20. The electronic device may set a second range, e.g., from 2.8 km/h to 3.2 km/h.

In step 1950, when the electronic device speed is determined not to correspond to the second speed v2, the electronic device determines that the second beacon has an error.

In step 1960, the electronic device abstains from processing the second beacon signal.

In step 1970, when the electronic device speed corresponds to the second speed v2, the electronic device determines that the second beacon is a normal beacon and that the first beacon has an error.

In step 1980, the electronic device abstains from processing the first beacon signal.

In step 1990, the electronic device reports error information to the server 106.

Alternatively, the electronic device may compare a latest received beacon signal with a beacon signal received a few steps before, while abstaining from only comparing the latest received beacon signal with a beacon signal received immediately before so as to determine whether there is an error.

For example, the electronic device may obtain a third distance d3 between the first beacon B1 and the third beacon B3 and its corresponding third speed v3. In this case, the electronic device may obtain its speed for a third time difference, which is a difference between the first time and the third time. The electronic device may set a third range corresponding to the electronic device speed for the third time difference. The electronic device may determine whether the beacon has an error, based on whether the third speed v3 corresponds to the third range.

Figure 21:
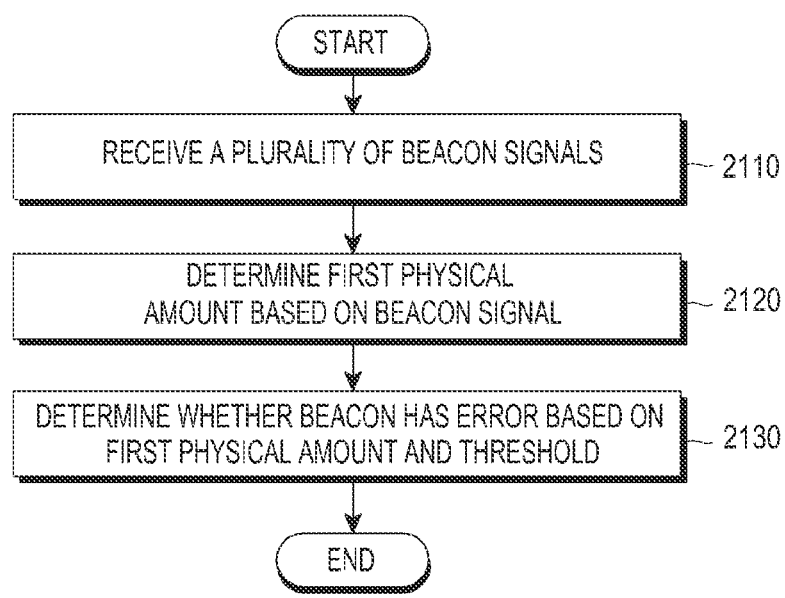
FIGS. 21 and 22 are flowcharts illustrating beacon managing methods according to embodiments of the present invention.

FIG. 21 is a flowchart illustrating a beacon managing method according to an embodiment of the present invention.

Referring to FIG. 21, in step 2110, an electronic device receives a plurality of beacon signals.

In step 2120, the electronic device determines a first physical amount, based on the received beacon signals. For example, a unit for representing the first physical amount may be a time unit, speed unit, or acceleration unit of the electronic device.

In step 2130, the electronic device determines whether a beacon has an error based on the first physical amount and a predetermined threshold.

Unlike the beacon managing method illustrated in FIG. 7, the beacon managing method illustrated in FIG. 21 may determine whether the beacon has an error without using movement information of the electronic device.

Figure 22:
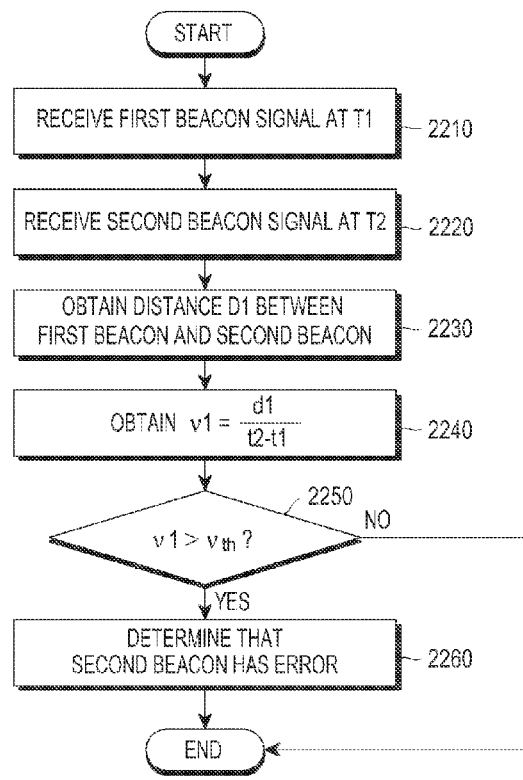

FIG. 22 is a flowchart illustrating a beacon managing method according to an embodiment of the present invention.

Figure 23:
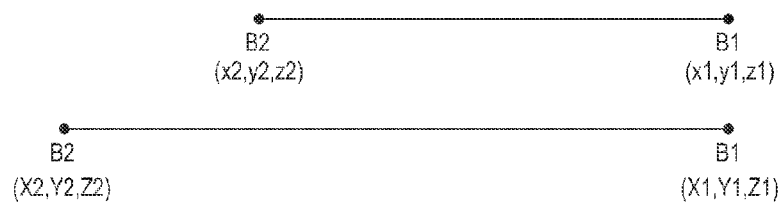
FIG. 23 illustrates an actual beacon topology and a managed beacon topology.

FIG. 23 illustrates actual beacon topology and managed beacon topology.

Referring to FIG. 23, in the managed beacon topology, a first beacon B1 and a second beacon B2, respectively, are disposed at (X1,Y1,Z1) and (X2,Y2,Z2). Further, in the actual beacon topology, the first beacon B1 and the second beacon B2, respectively, are disposed at (x1,y1,z1) and (x2,y2,z2). Accordingly, the second beacon B2 is actually closer to the first beacon B1 than is reflected in the managed beacon topology.

Referring to FIG. 22, in step 2210, an electronic device receives a first beacon signal from the first beacon B1 at a first time t1. The electronic device may store a beacon signal reception history.

In step 2220, the electronic device receives a second beacon signal from the second beacon B2 at a second time t2. The electronic device may store a beacon signal reception history.

In step 2230, the electronic device obtains a first distance d1 between the first beacon B1 and the second beacon B2. Here, the first distance d1 may be a distance for moving from the first beacon B1 to the second beacon B2. Further, the first distance d1 may be a distance based on beacon topology managed by a server or the electronic device.

In step 2240, the electronic device determines a first speed v1 from the first distance d1. The electronic device may determine a first time difference ($\Delta t1$) based on a second time t2 and a first time t1. The electronic device may determine the first speed v based on the first time difference ($\Delta t1$) and the first distance d1.

In FIG. 23, the first speed v1 in the actual beacon topology may be larger than the speed in the managed beacon topology.

In step 2250, the electronic device determines whether the first speed v1 exceeds a threshold speed vth. Here, the threshold speed vth may be a predetermined speed managed by the electronic device or the server.

In step 2260, when the first speed v1 is determined to be larger than the threshold speed, the electronic device determines that the second beacon has an error.

As described above, the electronic device may determine whether a beacon has an error without using movement information of the electronic device.

The above-described speed-based comparison is merely an example, and an electronic device according to an embodiment of the present invention may also determine whether an error occurs through time comparison.

Figure 24:
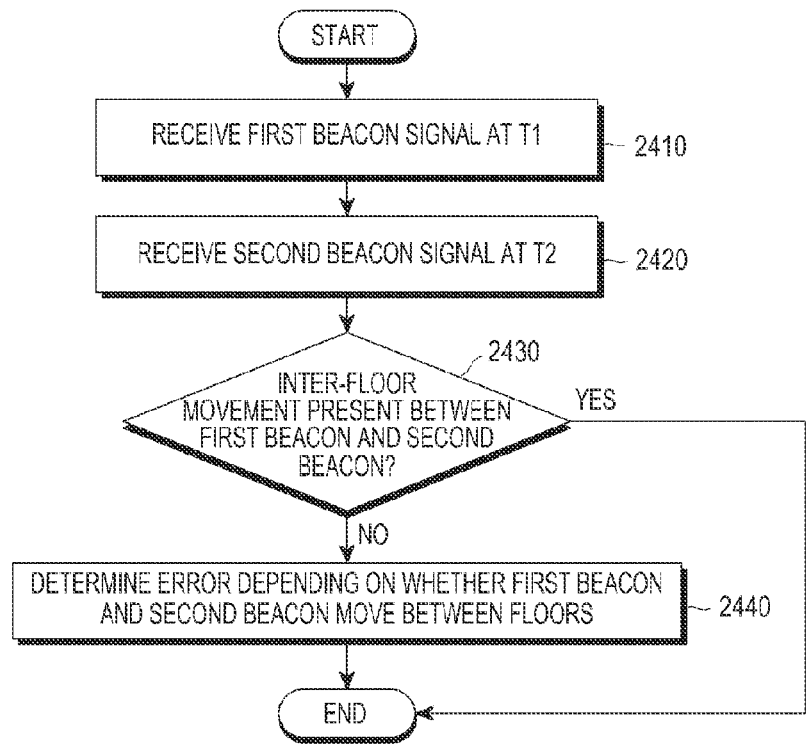
FIG. 24 is a flowchart illustrating a beacon managing method according to an embodiment of the present invention.
Figure 25:
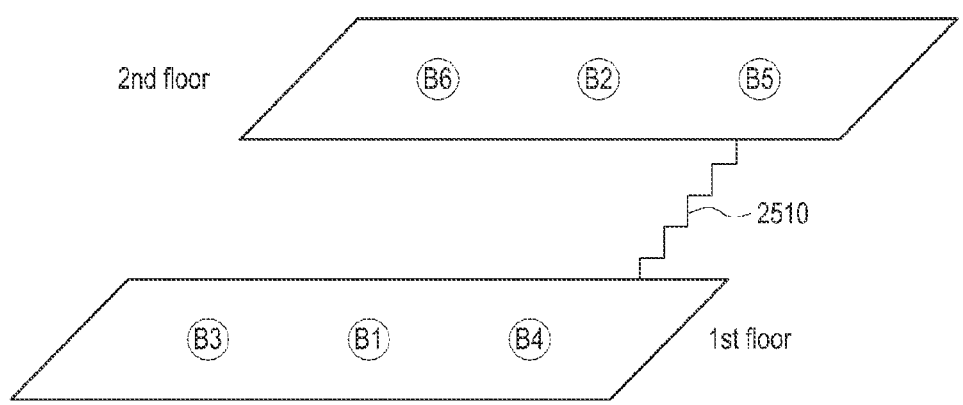
FIG. 25 illustrates an actual beacon topology and a managed beacon topology.

FIG. 24 is a flowchart illustrating a beacon managing method according to an embodiment of the present invention. FIG. 25 illustrates managed beacon topology.

Referring to FIG. 24, in step 2410, an electronic device receives a first beacon signal from a first beacon B1 at a first time t1. The electronic device may store a beacon signal reception history.

In step 2420, the electronic device receives a second beacon signal from a second beacon B2 at a second time t2. The electronic device may store a beacon signal reception history.

In step 2430, the electronic device determines whether there is an inter-floor difference between the first beacon B1 and the second beacon B2.

In FIG. 25, the first beacon B1 is located on a first floor, and the second beacon B2 is located on a second floor. Accordingly, an inter-floor difference of one floor is present between the first beacon B1 and the second beacon B2, and the electronic device may obtain the same.

The electronic device may determine whether an error occurs depending on whether the first beacon B1 and the second beacon B2 are beacons that may move between floors. For example, in FIG. 25, a fourth beacon B4 and a fifth beacon B5 are positioned near a stairway 2510, and thus, are beacons that may move between floors. The first to third beacons B1 to B3 and a sixth beacon B6, which are not adjacent to the stairway 2510, are beacons that do not move between floors.

In step 2440, the electronic device determines that the first beacon B1 and the second beacon B2 are beacons that might not move between floors, and accordingly, determines that the second beacon B2 has an error.

Figure 26:
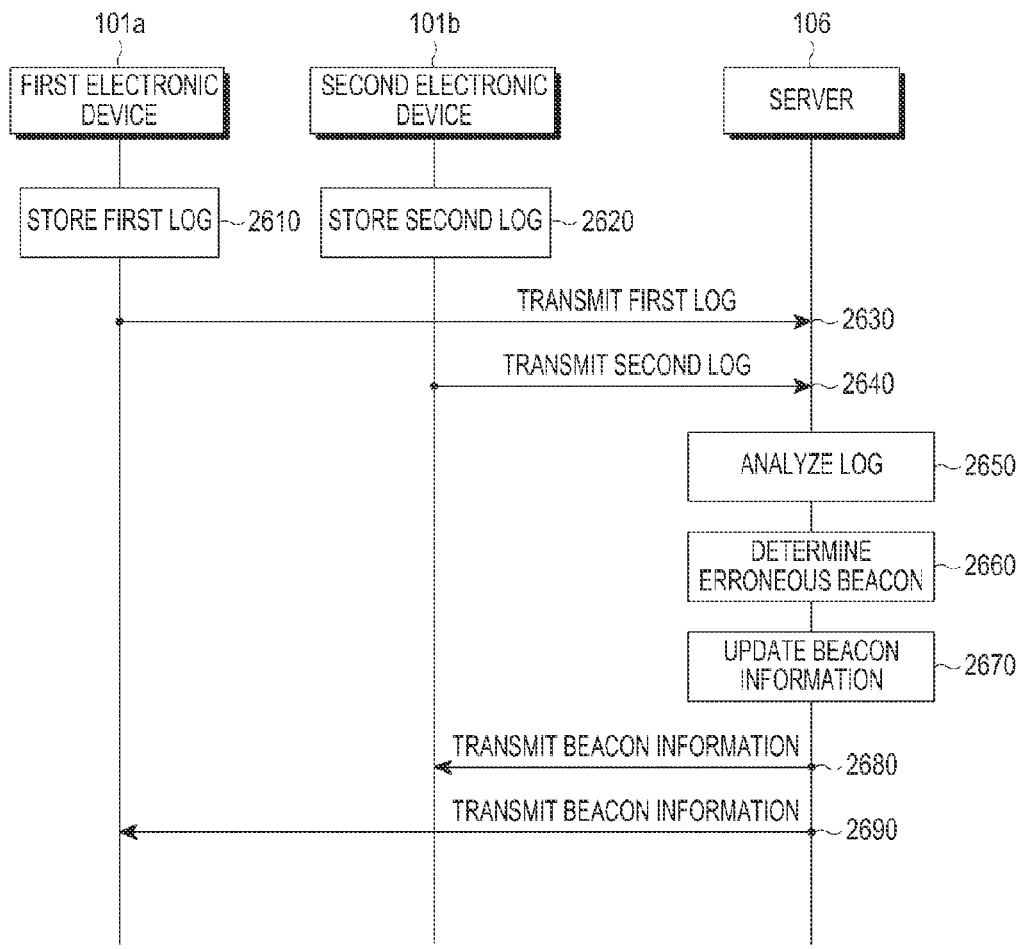
FIG. 26 is a signal flow diagram illustrating a beacon managing method according to an embodiment of the present invention.

FIG. 26 is a signal flow diagram illustrating a beacon managing method according to an embodiment of the present invention.

Referring to FIG. 26, in step 2610, a first electronic device 101*a* stores a first log, which may include a history of beacon signals received by the first electronic device 101*a*. Herein, the term "log" may also be referred to as a beacon signal reception history.

In step 2620, a second electronic device 101*b* stores a second log, which may include a history of beacon signals received by the second electronic device 101*b*.

In step 2630, the first electronic device 101*a* transmits the first log to the server 106, and in step 2640, the second electronic device 101*b* transmits the second log to the server 106.

In step 2650, the server 106 analyzes the received first log and second log. For example, the server 106 may compare the first log with the second log.

In step 2660, the server 106 determines a beacon having an error based on a result of the log analysis.

In step 2670, the server 106 updates beacon information based on the error.

In steps 2680 and 2690, the server 106 transmits the updated beacon information to the second electronic device 101*b* and the first electronic device 101*a*, respectively.

Figure 27:
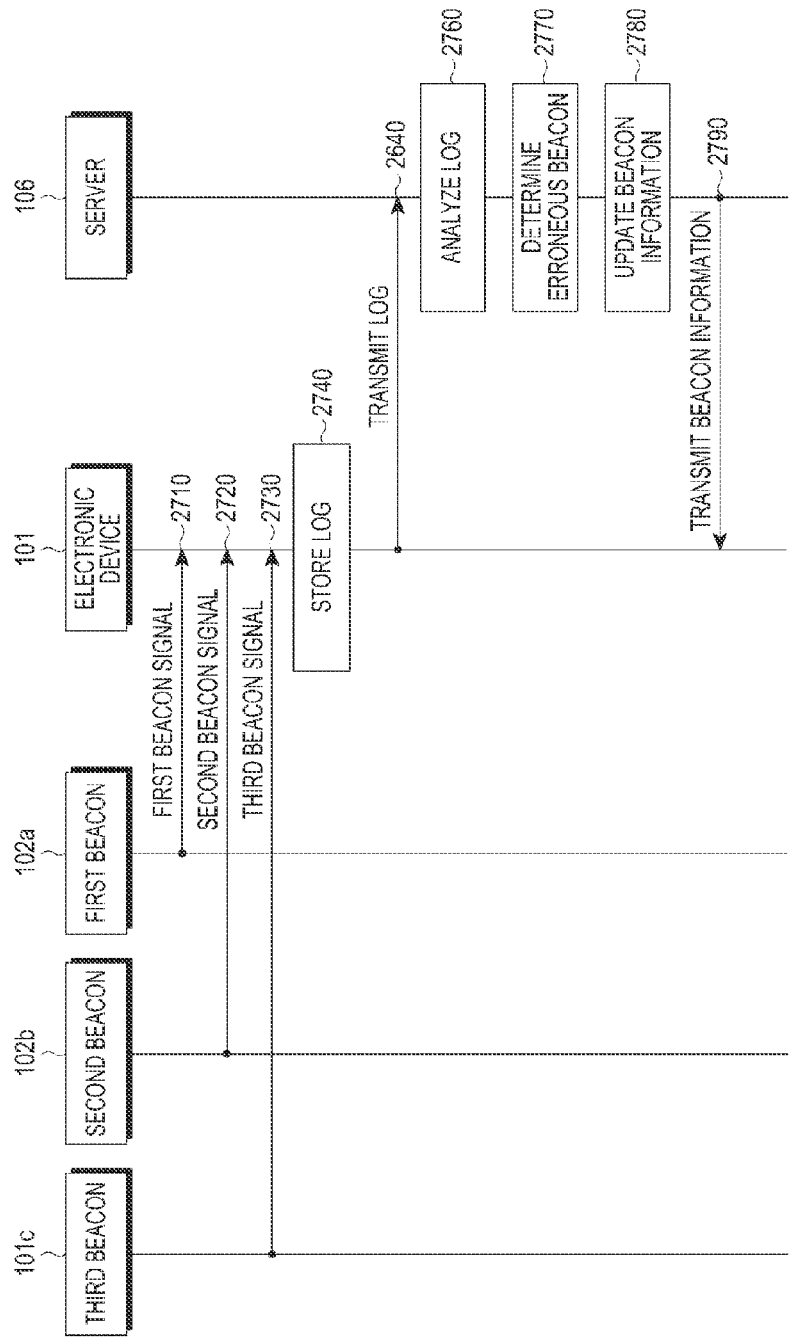
FIG. 27 is a signal flow diagram illustrating a beacon managing method according to an embodiment of the present invention.

FIG. 27 is a signal flow diagram illustrating a beacon managing method according to an embodiment of the present invention. In FIG. 27, it is assumed that an electronic device 101 receives a plurality of beacon signals within a shorter time than a predetermined threshold.

Referring to FIG. 27, in step 2710, the electronic device 101 receives a first beacon signal from a first beacon 102*a* at a first time.

In step 2720, the electronic device 101 receives a second beacon signal from a second beacon 102*b* at a second time.

In step 2730, the electronic device 101 receives a third beacon signal from a third beacon 102*c* at a third time. Here, a time interval between the first time and the third time is assumed to be shorter than the predetermined threshold.

In step 2740, the electronic device 101 stores a log when the time difference in beacon signal reception time is smaller than a predetermined threshold.

In step 2750, the electronic device 101 transmits the stored log to the server 106.

In step 2760, the server 106 analyzes the received log. For example, the server 106 may analyze the log received from the electronic device 101, together with a log received from another electronic device.

In step 2770, the server 106 determines an erroneous beacon based on a result of the log analysis.

In step 2780, the server 106 updates beacon information by reflecting the error.

In step 2790, the server 106 transmits the updated beacon information to the electronic device 101.

Figures 28A, 28B:
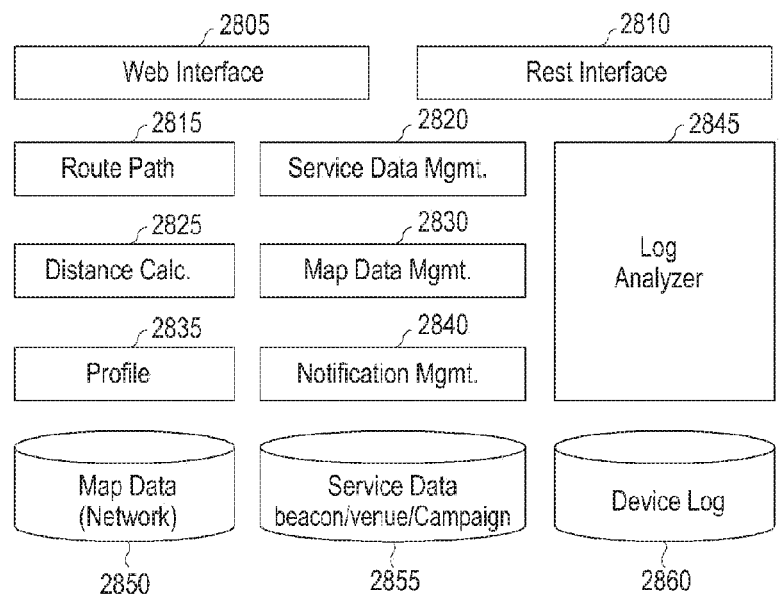
FIG. 28A illustrates a configuration of a server according to an embodiment of the present invention.
FIG. 28B is a table illustrating a beacon list according to an embodiment of the present invention.

FIG. 28A illustrates a configuration of a server according to an embodiment of the present invention.

Referring to FIG. 28A, the server includes a web interface module 2805, a rest interface module 2810, a route path module 2815, a service data management module 2820, a distance calculator module 2825, a map data management module 2830, a profile module 2835, a notification management module 2840, a log analyzer module 2845, a map database 2850, a service database 2855, and a device log database 2860.

The web interface module 2805 may receive or modify information on a beacon, topological information, and log information in the form of a webpage, a hybrid web, or an application through an Internet web protocol.

The rest interface module 2810 may be implemented in a type of REST that is a call protocol of the WEB. The rest interface module 2810 may function as an interface to allow a library included in a terminal or an application implemented in the terminal to communicate with a server in order to transmit or receive the information on the beacon, information related to the beacon, and information on the terminal.

The route path module 2815 may compute a path between two particular points as per map data.

The service data management module 2820 may process information, such as information on a beacon or group or relevant information, in the form of a table or list so that the information may be provided to a user. An example of the table is illustrated in FIG. 28B.

The distance calculator module 2825 may compute a distance between two particular points.

The map data management module 2830 may perform inquiry, modification, or history management on data, such as a map drawing, a network, and a link.

The profile module 2835 may include information on moving states of an electronic device, such as, e.g., a walk state, a run state, or a climb state.

The notification management module 2840 may notify a service data manager of automatic modification of an error or occurrence of a critical error.

The log analyzer module 2845 may perform the process of creating a raw data type of log of an electronic device into a path per time or per event and may compare the processed data with map data to automatically process network data.

The map database 2850 may include topological information in a group. The map data may include data, such as the map drawing, network, and link.

The service database 2855 may store a table or list generated in the service data management module 2820.

The device log database 2860 may store a log received from a device.

As described above, an electronic device may directly manage beacon topology as well. In such case, the electronic device may include at least one of the map database, the map data management module, the route path module, and the distance calculation module.

Figure 29:
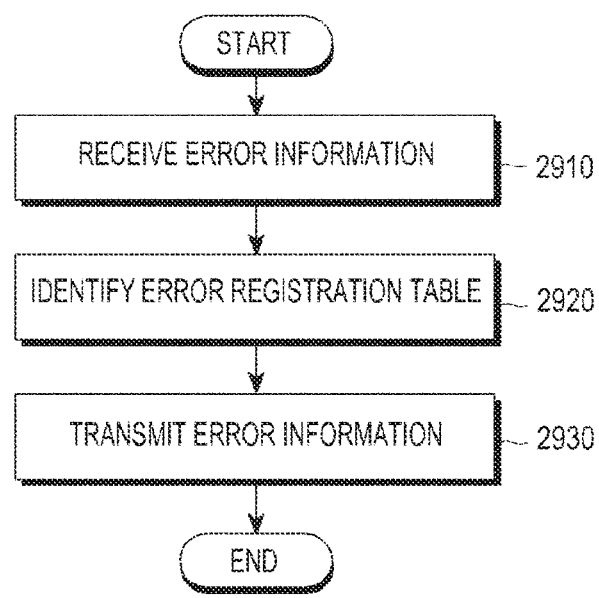
FIGS. 29 to 31 are flowcharts illustrating operations of a server receiving an error report according to various embodiments of the present invention.
Figure 30:
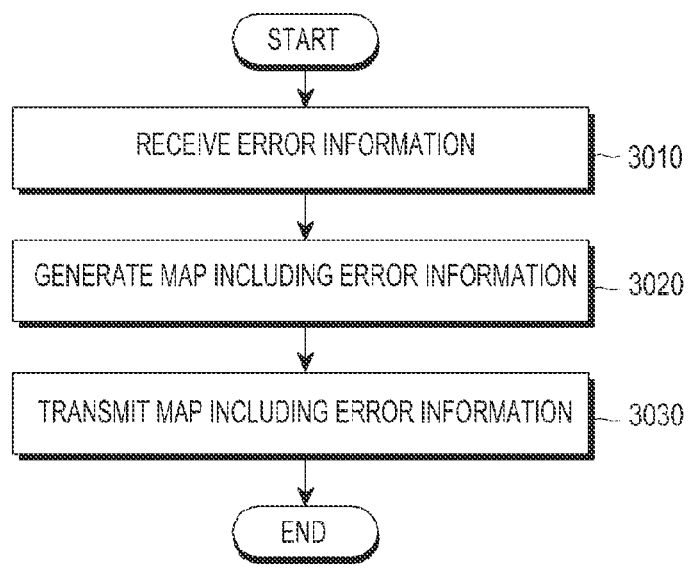
Figure 31:
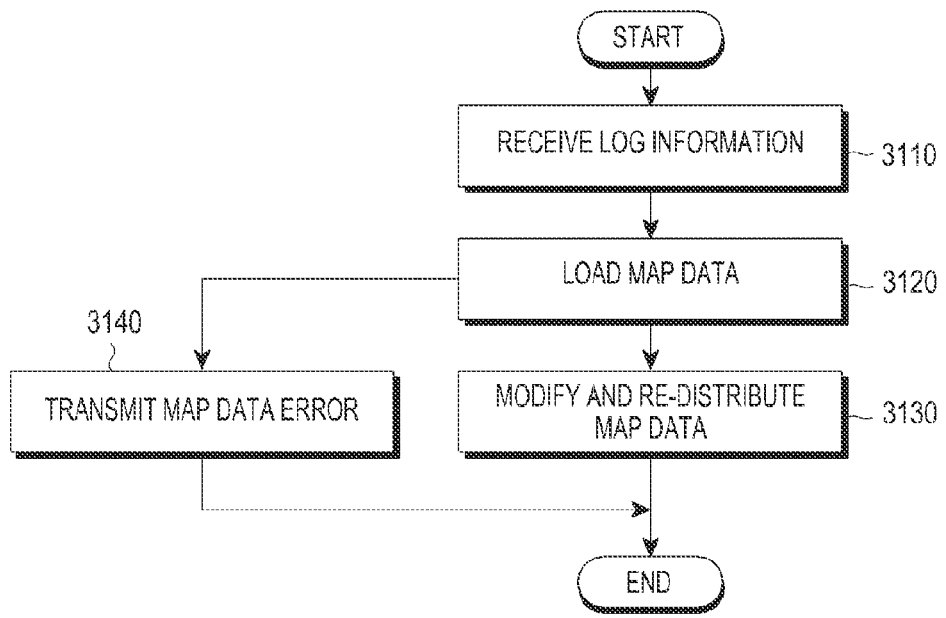

FIGS. 29 to 31 are flowcharts illustrating operations of a server receiving an error report according to various embodiments of the present invention.

Referring to FIG. 29, the server receives error information in step 2910.

In step 2920, the server registers the received error information in an error registration table and may identify the same. In step 2930, the server transmits the error information to another electronic device.

Referring to FIG. 30, the server receives error information in step 3010.

In step 3020, the server generates map data including error information, and in step 3030, the server transmits the map data including the error information.

Referring to FIG. 31, in step 3110, the server receives log information.

In step 3120, the server loads map data. Specifically, the server loads network data of the map data. The server 106 may determine whether to be able to remove a variable wall among the network data, and when possible, the server, in step 3130, modifies variable wall data and then redistributes the map data. When the variable wall cannot be removed, the server transmits information indicating that a map data error occurs, e.g., through the notification management module 2840, in step 3140.

Accordingly, a server may trace respective movement paths of a plurality of terminals based on at least one of beacon information and a log received from each of the plurality of terminals. Further, the server may determine whether the network information and link information of the map data comply with the traced movement paths. The server, when determining that the network (or path) has moved, may vary the map data. The map data may be automatically or manually varied.

The server may transmit the modified map data, send a request for log information or location information to a terminal, transmit topological information on an updated area to all the terminals, or transmit an indication that the topological information on the updated area has been varied. The server may determine that a terminal is related to the corresponding topology based on log information transmitted within a predetermined time and may transmit updated information to the related terminal.

Figure 32:
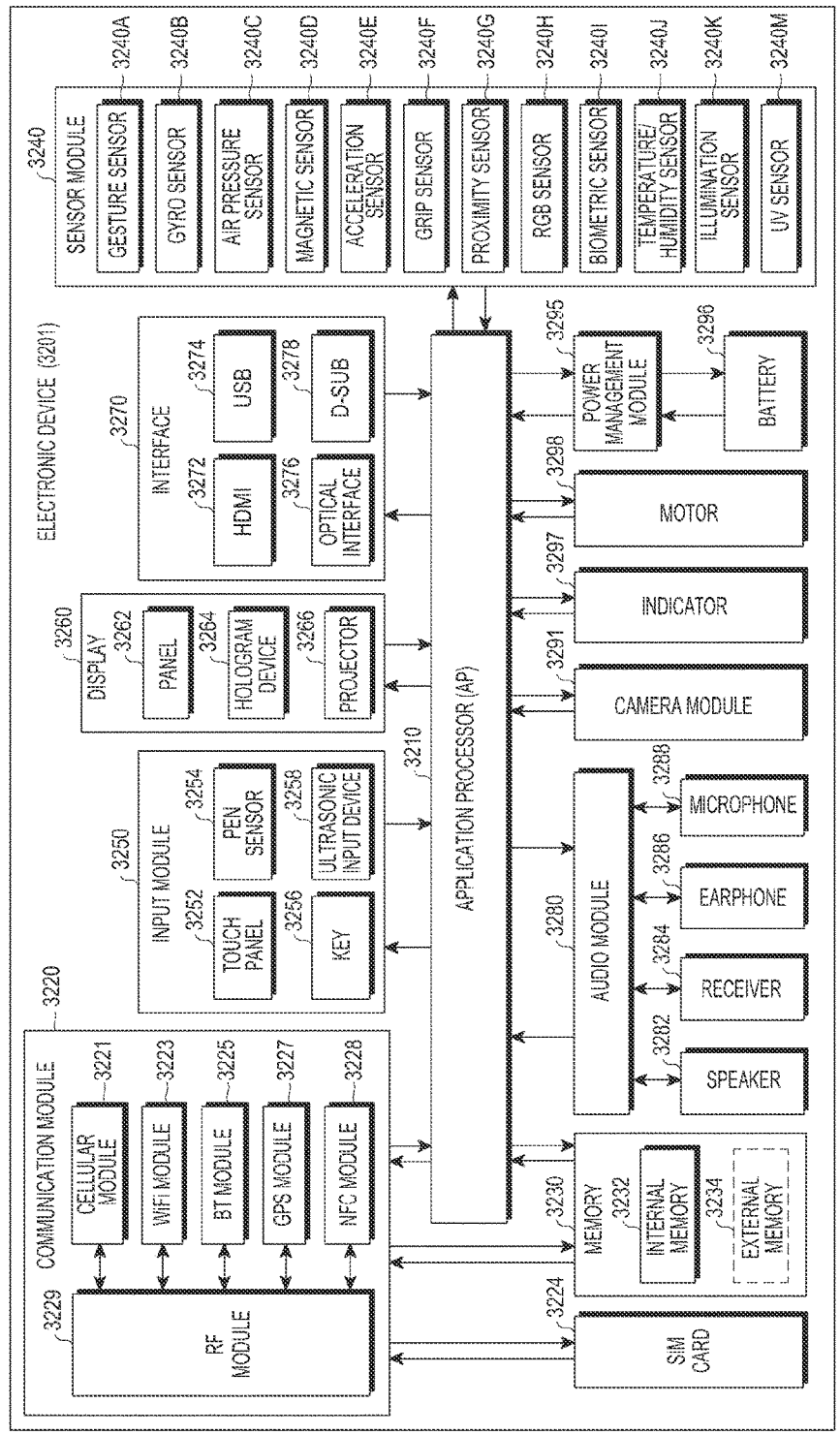
FIG. 32 illustrates an electronic device according to an embodiment of the present invention.

FIG. 32 illustrates an electronic device according to an embodiment of the present disclosure. The electronic device 3201, as illustrated in FIG. 32, may be substitute for the electronic device 101 in the network environment illustrated in FIG. 1.

Referring to FIG. 32, the electronic device 3201 includes an application processor (AP) 3210, a communication module 3220, a subscriber identification module (SIM) card 3224, a memory 3230, a sensor module 3240, an input module 3250, a display 3260, an interface 3270, an audio module 3280, a camera module 3291, a power management module 3295, a battery 3296, an indicator 3297, and a motor 3298.

The AP 3210 may control multiple hardware and software components connected to the AP 3210 by running, e.g., an OS or application programs, and the AP 3210 may process and compute various data. The AP 3210 may be implemented in, e.g., a System on Chip (SoC). The AP 3210 may further include a graphic processing unit (GPU) and/or an image signal processor. The AP 3210 may include at least some (e.g., the cellular module 3221) of the components illustrated in FIG. 2. The AP 3210 may load a command or data received from at least one of other components (e.g., a non-volatile memory) on a volatile memory, process the command or data, and store various data in the non-volatile memory.

The communication module 3220 may have the same or similar configuration to the communication interface 170 as illustrated in FIG. 1. The communication module 3220 includes a cellular module 3221, a Wi-Fi module 3223, a BT module 3225, a GPS module 3227, an NFC module 3228, and a radio frequency (RF) module 3229.

The cellular module 3221 may provide voice call, video call, text, or Internet services through a communication network (e.g., an LTE, LTE-A, CDMA, WCDMA, UMTS, WiBro, or GSM network). The cellular module 3221 may perform identification or authentication of an electronic device in a communication network using the SIM card 3224.

The cellular module 3221 may perform at least some of the functions providable by the AP 3210. The cellular module 3221 may include a communication processor (CP). The Wi-Fi module 3223, the BT module 3225, the GPS module 3227, or the NFC module 3228 may include a process for processing data communicated through the module. At least some (e.g., two or more) of the cellular module 3221, the Wi-Fi module 3223, the BT module 3225, the GPS module 3227, and the NFC module 3228 may be included in a single integrated circuit (IC) or an IC package.

The RF module 3229 may communicate data, e.g., RF communication signals. The RF module 3229 may include a transceiver, a power amp module (PAM), a frequency filter, a low noise amplifier (LNA), and/or an antenna. At least one of the cellular module 3221, the Wi-Fi module 3223, the BT module 3225, the GPS module 3227, or the NFC module 3228 may communicate RF signals through a separate RF module.

The SIM card 3224 may include a subscriber identification module and/or an embedded SIM, and may contain unique identification information (e.g., an integrated circuit card identifier (ICCID) or subscriber information (e.g., an international mobile subscriber identity (IMSI)).

The memory 3230 includes an internal memory 3232 or an external memory 3234. The internal memory 3232 may include at least one of a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD).

The external memory 3234 may include a flash drive, such as a CF (compact flash) memory, an SD (9 secure digital) memory, a micro-SD memory, a mini-SD memory, an xD (extreme digital) memory, or a memory Stick®. The external memory 3234 may be functionally and/or physically connected with the electronic device 3201 via various interfaces.

For example, the sensor module 3240 may measure a physical quantity or detect an operational state of the electronic device 3201, and the sensor module 3240 may convert the measured or detected information into an electrical signal. The sensor module 3240 includes a gesture sensor 3240A, a gyro sensor 3240B, an atmospheric pressure sensor 3240C, a magnetic sensor 3240D, an acceleration sensor 3240E, a grip sensor 3240F, a proximity sensor 3240G, a color sensor 3240H, such as an RGB (Red, Green, Blue) sensor, a bio sensor 3240I, a temperature/humidity sensor 3240J, an illumination sensor 3240K, or an Ultra Violet (UV) sensor 2340M.

Additionally or alternatively, the sensor module 3240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor.

The sensor module 3240 may further include a control circuit for controlling at least one or more of the sensors included in the sensor module.

The electronic device 3201 may further include a processor configured to control the sensor module 3240 as part of an AP 3210 or separately from the AP 3210, and the electronic device 3201 may control the sensor module 3240 while the AP is in a sleep mode.

The input module 3250 includes a touch panel 3252, a (digital) pen sensor 3254, a key 3256, and an ultrasonic input device 3258. The touch panel 3252 may use at least one of capacitive, resistive, infrared, or ultrasonic methods. The touch panel 3252 may further include a control circuit and/or a tactile layer for providing a user with a tactile reaction. The (digital) pen sensor 3254 may include a part of a touch panel or a separate sheet for recognition.

The key 3256 may include a physical button, optical key or key pad.

The ultrasonic input device 3258 may use an input tool that generates an ultrasonic signal and enable the electronic device 3201 to identify data by sensing the ultrasonic signal to a microphone 3288.

The display 3260 includes a panel 3262, a hologram device 3264, and a projector 3266. The panel 3262 may have the same or similar configuration as the display 160 illustrated in FIG. 1. The panel 3262 may be implemented to be flexible, transparent, and/or wearable. The panel 3262 may also be incorporated with the touch panel 3252 in a module.

The hologram device 3264 may make three dimensional (3D) images (holograms) in the air by using light interference.

The projector 3266 may display an image by projecting light onto a screen. The screen may be, for example, located inside or outside of the electronic device 3201.

The display 3260 may further include a control circuit to control the panel 3262, the hologram device 3264, and/or the projector 3266.

The interface 3270 includes a High Definition Multimedia Interface (HDMI) 3272, a USB 3274, an optical interface 3276, or a D-subminiature (D-sub) 3278.

Additionally or alternatively, the interface 3270 may include a Mobile High-definition Link (MHL) interface, a secure digital (SD) card/multimedia card (MMC) interface, and/or an IrDA standard interface.

The audio module 3280 may convert a sound into an electric signal or vice versa, for example. The audio module 3280 may process sound information input or output through e.g., a speaker 3282, a receiver 3284, an earphone 3286, or a microphone 3288.

For example, the camera module 3291 may be a device for capturing still images and videos, and may include one or more image sensors (e.g., front and back sensors), a lens, an Image Signal Processor (ISP), or a flash such as an LED or xenon lamp.

The power manager module 3295 may manage power of the electronic device 3201.

A Power management Integrated Circuit (PMIC), a charger IC, and/or a battery or battery gauge may be included in the power manager module 3295. The PMIC may have a wired and/or wireless recharging scheme. The wireless charging scheme may include a magnetic resonance scheme, a magnetic induction scheme, and/or an electromagnetic wave based scheme, and an additional circuit, such as a coil loop, a resonance circuit, a rectifier, etc., may be added for wireless charging.

The battery gauge may measure an amount of remaining power of the battery 3296, a voltage, a current, or a temperature while the battery 3296 is being charged. The battery 3296 may be a rechargeable battery and/or a solar battery.

The indicator 3297 may indicate a particular state of the electronic device 3201 or a part of the electronic device (e.g., the AP 3210), including a booting state, a message state, or recharging state.

The motor 3298 may convert an electric signal to a mechanical vibration and to generate a vibrational or haptic effect. A processing unit for supporting mobile TV, such as a GPU may be included in the electronic device 3201. The processing unit for supporting mobile TV may process media data conforming to a standard for Digital Multimedia Broadcasting (DMB), Digital Video Broadcasting (DVB), or media flow.

Each of the aforementioned components of the electronic device 3201 may include one or more parts, and a name of the part may vary with a type of the electronic device 3201.

In accordance with various embodiments of the present invention, the electronic device 3201 may include at least one of the aforementioned components, omit some of them, or include other additional component(s). Some of the components may be combined into an entity, but the entity may perform the same functions as the components may do.

At least a part of any device (e.g., modules or their functions) or method (e.g., operations) in the above-described embodiments of the present invention may be implemented as instructions stored in a computer-readable storage medium e.g., in the form of a program module. The instructions, when executed by a processor, control the processor to carry out a corresponding function. The computer-readable storage medium may be a memory.

The computer-readable storage medium may include a hardware device, such as hard discs, floppy discs, and magnetic tapes (e.g., a magnetic tape), optical media such as Compact Disc ROMs (CD-ROMs) and Digital Versatile Discs (DVDs), magneto-optical media such as floptical disks, ROMs, RAMs, Flash Memories, etc. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

According to an embodiment of the present disclosure, a storage medium storing commands is provided. The commands are configured to control at least one processor to perform at least one process when executed by the at least one processor. The at least one processor may include receiving a first beacon signal from a first beacon at a first time and receiving a second beacon signal from a second beacon at a second time; and identifying a location error of at least one of the first beacon and the second beacon based on first movement information of a terminal between the first time and the second time.

According to an embodiment of the present invention, when a beacon is improperly relocated, irrelevant information regarding the beacon's new position may be prevented from being displayed on a electronic device receiving a beacon signal.

A server may manage erroneous information on a beacon and send the same to other terminals. The other terminals may abstain from processing relevant information on the beacon that has caused an error.

Accordingly, the occurrence of errors and management of moved beacons may be easily performed.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method of managing a beacon by a terminal, the method comprising:
   receiving, from a first beacon, a first beacon signal at a first time;
   receiving, from a second beacon, a second beacon signal at a second time;
   obtaining a first distance between the first beacon and the second beacon based on stored topographical information regarding location information of the first beacon and location information of the second beacon;
   estimating a movement of the terminal by using the first distance, the first time, and the second time;
   sensing first movement information of the terminal; and
   determining whether at least one of the first beacon and the second beacon is misplaced in comparison with the stored topographical information, by comparing the sensed first movement information and the estimated movement of the terminal.

2. The method of claim 1, further comprising:
   obtaining a first time difference between the first time and the second time; and
   obtaining a first speed based on the first time difference and the first distance.

3. The method of claim 2, wherein determining whether the at least one of the first beacon and the second beacon is misplaced in comparison with the stored topographical information comprises:
   obtaining a first terminal speed based on the first movement information;
   comparing the first speed and the first terminal speed; and
   determining whether the at least one of the first beacon and the second beacon is misplaced in comparison with the stored topographical information, based on a result of the comparing.

4. The method of claim 3, further comprising determining at least one of the first beacon and the second beacon as a suspect beacon, when the first speed exceeds the first terminal speed.

5. The method of claim 4, further comprising:
   receiving, from a third beacon, a third beacon signal at a third time;
   obtaining a second time difference between the second time and the third time;
   obtaining a second distance between the third beacon and the second beacon based on stored topographical information regarding the location information of the second beacon and location information of the third beacon; and
   obtaining a second speed based on the second time difference and the second distance.

6. The method of claim 5, further comprising:
   obtaining a second terminal speed based on second movement information of the terminal between the second time and the third time; and
   comparing the second speed with the second terminal speed.

7. The method of claim 6, further comprising:
   determining that the second beacon is misplaced in comparison with the stored topographical information, when the second speed is greater than the second terminal speed; and
   abstaining from processing the second beacon signal.

8. The method of claim 6, further comprising:
   determining that the first beacon is misplaced in comparison with the stored topographical information, when the second speed is less than or equal to the second terminal speed; and
   abstaining from processing the first beacon signal.

9. The method of claim 6, further comprising:
   obtaining a third time difference between the first time and the third time;

obtaining a third distance between the third beacon and the first beacon based on stored topographical information regarding the location information of the first beacon and the location information of the third beacon; and obtaining a third speed based on the third time difference and the third distance.

10. The method of claim 9, further comprising:
obtaining a third terminal speed from third movement information of the terminal between the first time and the third time; and
comparing the third speed with the third terminal speed; and
determining whether the at least one of the first beacon and the second beacon is misplaced in comparison with the stored topographical information, based on a result of the comparing of the second speed and the second terminal speed and a result of the comparing of the third speed and the third terminal speed.

11. The method of claim 10, further comprising determining a normal beacon from among the first beacon and the second beacon and determining that the other beacon among the first beacon and the second beacon has an error, based on the result of the comparing of the second speed and the second terminal speed and the result of the comparing of the third speed and the third terminal speed.

12. The method of claim 3, further comprising:
determining that the second beacon is misplaced in comparison with the stored topographical information, when the first speed is greater than the first terminal speed; and
abstaining from processing the second beacon signal.

13. The method of claim 2, wherein obtaining the first distance comprises one of:
computing the first distance; or
receiving the first distance.

14. The method of claim 6, wherein obtaining the second distance comprises one of:
computing the second distance; or
receiving the second distance.

15. The method of claim 1, wherein determining whether the at least one of the first beacon and the second beacon is misplaced in comparison with the stored topographical information comprises:
determining whether there is an inter-floor difference between the first beacon and the second beacon and vertical movement information obtained from the first location information; and
determining whether the at least one of the first beacon and the second beacon is misplaced in comparison with the stored topographical information, based on whether there is the inter-floor difference between the first beacon and the second beacon and the vertical movement information obtained from the first location information.

16. The method of claim 1, further comprising:
receiving first beacon information for the first beacon; and
receiving second beacon information for the second beacon.

17. The method of claim 1, further comprising storing a beacon signal reception history of the first beacon signal and the second beacon signal.

18. The method of claim 1, further comprising transmitting the determination as to whether the at least one of the first beacon and the second beacon is misplaced in comparison with the stored topographical information to a server.

19. The method of claim 1, further comprising abstaining from processing at least one of relevant information of the first beacon and relevant information of the second beacon, based on the determination as to whether the at least one of the first beacon and the second beacon is misplaced in comparison with the stored topographical information.

20. The method of claim 2, wherein determining whether the at least one of the first beacon and the second beacon is misplaced in comparison with the stored topographical information comprises:
determining whether the first speed is included in a first range corresponding to the first location information; and
determining whether the at least one of the first beacon and the second beacon is misplaced in comparison with the stored topographical information, based on whether the first speed is included in the first range.

21. The method of claim 20, further comprising:
receiving a third beacon signal from a third beacon at a third time;
obtaining a second time difference between the second time and the third time;
obtaining a second distance between the third beacon and the second beacon based on stored topographical information regarding the location information of the second beacon and the location information of the third beacon;
obtaining a second speed based on the second time difference and the second distance;
determining whether the second speed is included in a second range corresponding to second location information of the terminal between the second time and the third time; and
determining that at least one of the first beacon and the second beacon is misplaced in comparison with the stored topographical information, based on whether the second speed is included in the second range.

22. A method for managing a beacon by a terminal, the method comprising:
receiving, from a first beacon, a first beacon signal at a first time;
receiving, from a second beacon, a second beacon signal at a second time;
obtaining a first distance between the first beacon and the second beacon based on stored topographical information regarding location information of the first beacon and location information of the second beacon;
estimating a movement of the terminal by using the first distance, the first time, and the second time;
sensing first movement information of the terminal; and
determining whether at least one of the first beacon and the second beacon is misplaced in comparison with the stored topographical information by comparing the sensed the first movement information and the estimated movement of the terminal, based on a result of a comparison between a time difference between the first time and the second time and a threshold set according to the first distance.

23. A method for managing a beacon by a terminal, the method comprising:
receiving, from a first beacon, a first beacon signal at a first time;
receiving, from a second beacon, a second beacon signal at a second time;
obtaining a first distance between the first beacon and the second beacon based on stored topographical information regarding location information of the first beacon and location information of the second beacon;

estimating a movement of the terminal by using the first distance and the first time and the second time;

sensing first movement information of the terminal; and determining whether at least one of the first beacon and the second beacon is misplaced in comparison with the stored topographical information by comparing the sensed the first movement information and the estimated movement of the terminal, based on whether there is an inter-floor difference between the first beacon and the second beacon and whether the first beacon and the second beacon is movable between floors.

24. A method for managing a beacon by a server, the method comprising:

receiving, from a terminal, a request for a distance between a first beacon and a second beacon;

transmitting, to the terminal, the distance between the first beacon and the second beacon based on stored topographical information regarding location information of the first beacon and location information of the second beacon;

receiving, from the terminal, information including a determination as to whether at least one of the first beacon and the second beacon is misplaced in comparison with the stored topographical information; and updating beacon information on the first beacon based on the received information.

25. The method of claim 24, wherein updating the beacon information on the first beacon comprises one of:

deleting information on the first beacon;

modifying the information on the first beacon; or updating map data for the first beacon.

26. The method of claim 24, wherein updating the beacon information comprises:

determining a variable wall of map data;

determining a variation in at least one of network information and link information based on the variable wall; and updating map data by reflecting the variation in the at least one of the network information and the link information.

27. The method of claim 24, further comprising transmitting, to the terminal, at least one of the updated beacon information and an indication that the beacon information has been updated.

28. A method for managing a beacon by a beacon managing server, the method comprising:

receiving, from each of a plurality of terminals, a beacon recognition log including terminal information;

updating beacon location information based on the received beacon recognition log including a determination as to whether the beacon is misplaced in comparison with stored topographical information; and transmitting at least one of the updated beacon location information and an indication that a beacon has been updated.

29. A terminal, comprising:

a beacon signal receiving module configured to receive, from a first beacon, a first beacon signal at a first time and to receive, from a second beacon, a second beacon signal at a second time;

a sensor configured to sense a first movement information of the terminal; and a processor configured to obtain a first distance between the first beacon and the second beacon based on stored topographical information regarding location information of the first beacon and location information of the second beacon, to estimate a movement of the terminal by using the first distance, the first time, and the second time, and to determine whether at least one of the first beacon and the second beacon is misplaced in comparison with the stored topographical information by comparing the sensed the first movement information and the estimated movement of the terminal.

30. A server, comprising:

a communication module configured to receive, from a terminal, a request for a distance between a first beacon and a second beacon, to transmit, to the terminal, the distance between the first beacon and the second beacon based on stored topographical information regarding location information of the first beacon and location information of the second beacon, and to receive, from the terminal, information including a determination as to whether at least one of the first beacon and the second beacon is misplaced in comparison with the stored topographical information; and a processor configured to update beacon information on the first beacon, based on the information.

* * * * *